(12) United States Patent
Kawakami et al.

(10) Patent No.: US 7,180,857 B2
(45) Date of Patent: Feb. 20, 2007

(54) APPARATUS AND METHOD FOR FLOW CONTROL

(75) Inventors: Tetsuya Kawakami, Sagamihara (JP); Yoshihiro Suzuki, Machida (JP); Satoshi Kitajima, Kawasaki (JP); Atsushi Nakamura, Kawasaki (JP)

(73) Assignee: Matsushita Electric Industrial Co., Ltd, Osaka (JP)

( * ) Notice: Subject to any disclaimer, the term of this patent is extended or adjusted under 35 U.S.C. 154(b) by 1017 days.

(21) Appl. No.: 10/140,174

(22) Filed: May 8, 2002

(65) Prior Publication Data
US 2002/0136163 A1  Sep. 26, 2002

Related U.S. Application Data

(63) Continuation-in-part of application No. 09/991,843, filed on Nov. 26, 2001, now abandoned.

(30) Foreign Application Priority Data
Nov. 24, 2000 (JP) ............................ 2000-358378
Nov. 5, 2001 (JP) ............................ 2001-339427

(51) Int. Cl.
*G01R 31/08* (2006.01)
*G06F 11/00* (2006.01)
*G08C 15/00* (2006.01)
*H04L 12/28* (2006.01)

(52) U.S. Cl. ............. 370/231; 370/235; 370/236; 370/408

(58) Field of Classification Search ............. 370/408, 370/229–240, 417–419
See application file for complete search history.

(56) References Cited

U.S. PATENT DOCUMENTS

| | | | | |
|---|---|---|---|---|
| 5,901,140 A * | 5/1999 | Van As et al. | ............... | 370/236 |
| 6,957,269 B2 * | 10/2005 | Williams et al. | ............ | 709/235 |
| 6,980,520 B1 * | 12/2005 | Erimli | ......... | 370/236 |
| 6,981,054 B1 * | 12/2005 | Krishna | ...................... | 709/235 |
| 2003/0016628 A1 * | 1/2003 | Kadambi et al. | ........... | 370/235 |

* cited by examiner

*Primary Examiner*—Ricky Q. Ngo
*Assistant Examiner*—Warner Wong
(74) *Attorney, Agent, or Firm*—Connolly Bove Lodge & Hutz LLP

(57) ABSTRACT

In flow control apparatus formed of a network of switching hubs in a hierarchy configuration for performing data packet transfer within each of a plurality of respectively separate groups of terminals, based on use of group identifiers contained in the data packets, occurrence of congestion of the output section of a port of a switching hub is judged respectively separately for each of the terminal groups, and one or more congestion notification packets for effecting a pause in data packet transmission are generated and transmitted from that switching hub, directed only to one or more terminals of a group relating to the congestion. As a result, the effects of port congestion and of congestion control operations are limited to the terminal group concerned. Congestion can be judged for a terminal group based on a level of utilization of a port output buffer that is used only by that group, or based on a rate of flow of data from that group into a port output buffer which is used in common for all terminal groups, and congestion notification packets may be transmitted from a single port or from a plurality of ports of a switching hub, in accordance with the detected degree of congestion.

31 Claims, 34 Drawing Sheets

FIG. 4

CONGESTION STATUS TABLE

| Group No. | Port No. | Flow Status | Timer Status |
|---|---|---|---|
| Group #1 | P0 | 00b | 0 |
|  | P1 | 01b | 0 |
|  | : | : | : |
|  | Pn | 00b | 0 |
| Group #2 | P0 | 00b | 0 |
|  | P1 | 10b | 0 |
|  | : | : | : |
|  | Pn | 11b | 0 |
| : | : | : | : |
| Group #m | P0 | 10b | 0 |
|  | P1 | 10b | 0 |
|  | : | : | : |
|  | Pn | 11b | 0 |

<u>Flow Status</u>
00b: not connected
01b: not in congested status
10b: congestion status 1 (individual congestion notification packet transmitted)
11b: congestion status 2 (group-specific congestion notification packet transmitted)

<u>Timer Status</u>
0: OFF
1: ON (retransmission timer in operation)

FIG. 7

EQUATION FOR DERIVING PAUSE TIME VALUE TO BE INSERTED IN GROUP-SPECIFIC CONGESTION NOTIFICATION PACKET $$PauseTime_{set} = PauseTime_x \{1.05 + \alpha \times random\} \quad \ldots(1)$$

where
$\quad \alpha = 0.5$, random = random number within range 0~1

FIG. 8

EQUATION FOR DERIVING PAUSE TIME VALUE TO BE INSERTED IN NEWLY GENERATED CONGESTION NOTIFICATION PACKET $$PauseTime_x = PauseTime_{in} \left( \frac{PortOutputSpeed\ (Mbps)}{PortSpeed_{in}\ (Mbps)} \right) \quad \ldots(2)$$

where:

$PauseTime_x$ = new pause time value (inserted directly into newly generated or regenerated individual congestion notification packet)

$PauseTime_{in}$ = pause time value which is supplied in packet generating information PortOutputSpeed = data output speed of output port for newly generated or regenerated congestion notification packet $PortSpeed_{in}$ = Port speed value which is supplied in packet generating information

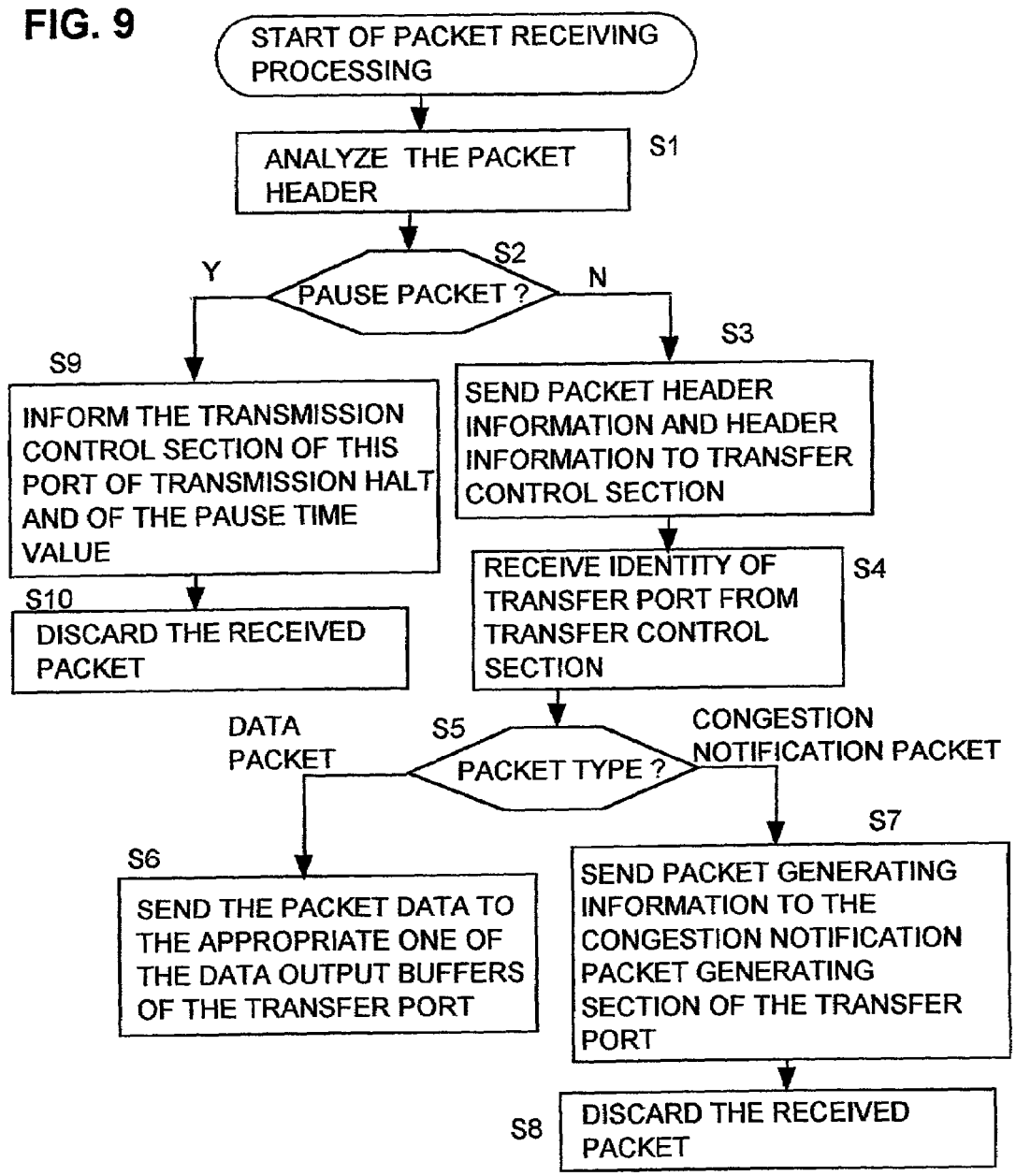

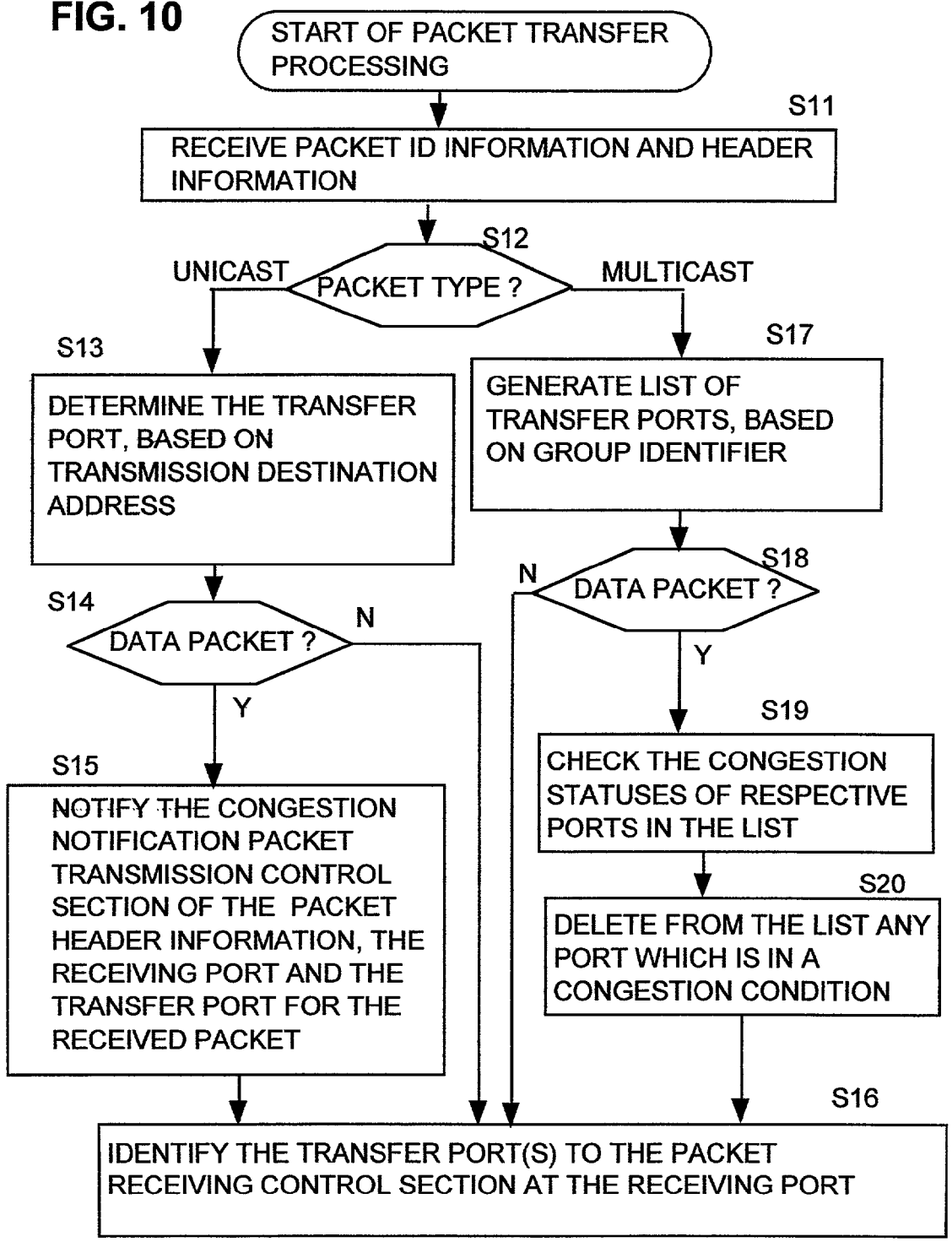

FIG. 18

TRANSFER RATE TABLE

| Port No. | Group No. | Rate count (kbyte) | Time Stamp (s) | Total rate (kbyte) |
|---|---|---|---|---|
| P0 | Group #1 | 0 | 0 | 80 |
|  | Group #2 | 30 | A |  |
|  | : | : | : |  |
|  | Group #m | 10 | B |  |
| P1 | Group #1 | 0 | C | 50 |
|  | Group #2 | 50 | D |  |
|  | : | : |  |  |
|  | Group #m | 0 | E |  |
| : | : | : |  |  |
| Pn | Group #1 | 30 | F | 100 |
|  | Group #2 | 10 | G |  |
|  | : | : |  |  |
|  | Group #m | 10 | H |  |

Rate count: NUMBER OF BYTES TRANSFERRED PER UNIT TIME INTERVAL BY THE DATA OUTPUT BUFFER CORRESPONDING TO THE SPECIFIED GROUP Time Stamp: TIME POINT AT WHICH A DATA PACKET FOR THE CORRESPONDING TERMINAL GROUP WAS LAST TRANSFERRED TO THIS PORT Total rate: TOTAL NUMBER OF BYTES TRANSFERRED PER UNIT TIME INTERVAL OUT OF THIS PORT FROM THE DATA OUTPUT BUFFERS

FIG. 19

CONGESTION STATUS TABLE
20b

| Port No. | Group No. | Rate Status | Buffer Status |
|---|---|---|---|
| P0 | Group #1 | 00b | 0 |
| | Group #2 | 01b | |
| | : | : | |
| | Group #m | 00b | |
| P1 | Group #1 | 10b | 1 |
| | Group #2 | 10b | |
| | : | | |
| | Group #m | 10b | |
| : | : | : | : |
| Pn | Group #1 | 10b | 0 |
| | Group #2 | 10b | |
| | : | | |
| | Group #m | 10b | |

Rate Status
00b: not connected
01b: assigned rate is not exceeded
10b: assigned rate is exceeded
  (individual congestion notification packet transmitted)

Buffer Status
0: non-congested status
1: congested status (group-specific congestion notification packet transmitted)

FIG. 28

OUTPUT MANAGEMENT TABLE

| Group No. | Read Status | Pause Status |
|---|---|---|
| Group #1 | 0 | 0 |
| Group #2 | 1 | 1 |
| : | : | : |
| Group #m | 1 | 2 |

Read Status  0: buffer readout possible
              1: buffer readout halted

Pause Status  0: halt timer not in operation
              1: halt timer in operation as result of receiving individual congestion notification packet
              2: halt timer in operation as result of receiving group-specific congestion notification packet

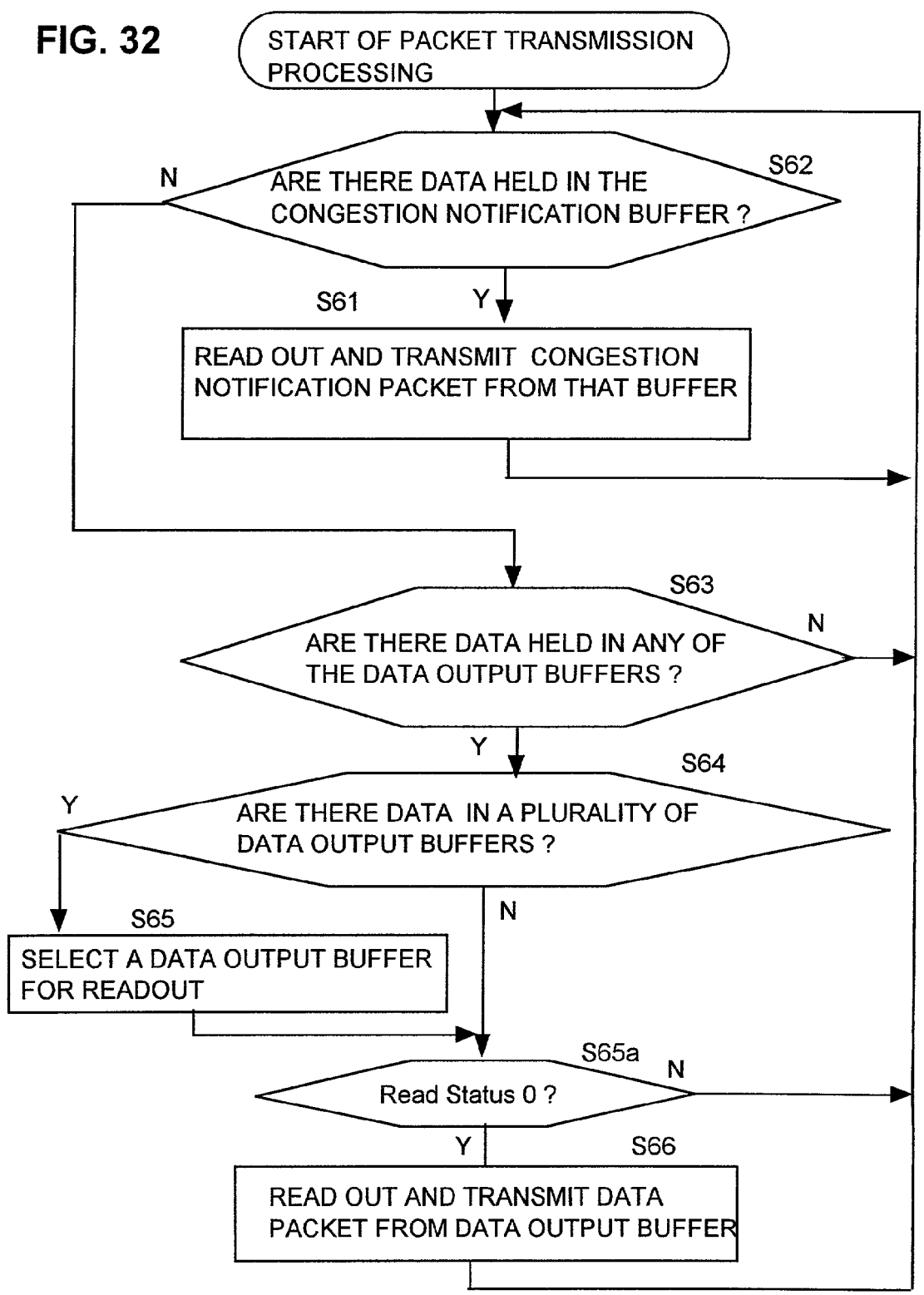

PAUSE PACKET

PAUSE PACKET

APPARATUS AND METHOD FOR FLOW CONTROL

RELATED APPLICATION

This is a continuation-in-part application of Ser. No. 09/991843 filed Nov. 26, 2001, now abandoned.

BACKGROUND OF THE INVENTION

1. Field of the Invention

The present invention relates to a flow control apparatus and flow control method for data packets. In particular, the invention relates to a flow control apparatus within a data switching network formed of a plurality of switching hubs connected in a hierarchy and a plurality of terminal groups which are assigned respective group identifiers, with the data packets being transferred between the terminals via ports of the switching hubs, and with at least some of the ports utilizing the identifiers of respectively different groups for multiplexed operation.

2. Description of Prior Art

The word "port" of a switching hub as used herein is to be understood to signify a port that is a combination of an input section and an output section, for respectively receiving and transmitting data packets. The term "terminal" is to be understood as broadly referring to a device such as a computer installation which can be a source/destination for standard format data packets, and in particular will be assumed to operate in accordance with the Ethernet (registered trade mark) standards. Furthermore the term "connection" between a terminal and a port of a hub in a switching network signifies that a path exists (external to the switching hub) for transmitting data packets to/from the terminal via that port.

FIG. 33A is a conceptual system block diagram for describing a prior art example of a data switching network which performs flow control by utilizing a switching hub. Letters A to D denote respective terminals each of which can receive and transmit data packets in accordance with Ethernet (registered trade mark) standards, applying full duplex flow control as specified in IEEE802.3x. In the following, "registered trade mark" will be abbreviated to "T.M.". These terminals A to D are respectively connected directly to ports P1 to P4 of a switching hub designated as SW1. It will be assumed that as indicated by the two arrowed dotted lines in FIG. 33A, the switching hub SW1 is transferring data packets which are transmitted from the terminal B to the terminal A while at the same time data packets are also being transmitted from the terminal C addressed to the terminal A.

Each of the ports P1 to P4 is provided with a corresponding input buffer, and if the amount of data packets received from the terminals B and C by the switching hub SW1 through the ports P2, P3 in a unit time interval exceeds the rate at which data can be transmitted from port P1 to the terminal A (i.e., the output port speed of port P1) then excess data packets are temporarily stored internally within the input buffers of these ports.

However if such storage of input data packets continues for an excessive duration, then the input buffers will overflow, and packets will thereby be lost.

For that reason, when it is detected that such overflow is about to occur, the switching hub SW1 generates a packet having a standardized form, referred to herein as a "pause packet", and transmits that to a terminal from which data packets are being received. In this example, the pause packet is transferred from the port P3 to the terminal C. The terminal is configured to respond to reception of a pause packet by halting further transmission of data packets during a time interval which is specified in the pause packet. The switching hub SW1 can thereby recover from the condition of input data packet overflow.

With such a flow control method, the ports P1 to P4 are controlled individually. FIG. 33B illustrates a network formed of a plurality of switching hubs SW2 to SW5 which are arranged in a hierarchy configuration, with the ports of hub SW2 each performing multiplexed control of data communication for a plurality of groups of terminals, with each group formed of a plurality of terminals which in general can communicate only with other terminals within the same group. That is to say, the groups can be utilized as respective VLANs (virtual local-area networks). The terminal groups are designated by respective identifier numbers, e.g., 1, 3 and 4 in FIG. 33B. If the method described above is applied to a system of the form shown in FIG. 33B, then the disadvantage arises that pause packets may be sent from a switching hub which will affect not only the intended terminal but also other terminals, of a different group, which are also connected to that switching hub.

In the example of FIG. 33B, the switching hub SW2 constitutes a backbone switching hub, performing multiplexed control of a set of front-end switching hubs SW3, SW4, SW5, having ports directly connected to a set of Ethernet (T.M.) terminals A to I. Each of the ports P21, P22, P23 of hub SW2 is directly connected to one of the ports of the corresponding one of the switching hubs SW2, SW4, SW5.

It is assumed in FIG. 33B that while data packets are being transmitted from the terminals D and G of group #1 to the terminal A, the aforementioned input buffer overflow condition has occurred in the switching hub SW2, and that a pause packet is transmitted from the switching hub SW2 through the port P23 to the switching hub SW5. As a result, all transmission of data packets from the switching hub SW5 is halted. Thus, transmission of data packets from the terminal I of group #4 (for example to terminal F) via the ports P23, P22 of the switching hubs SW5 is also halted. Thus, data communication within a terminal group which is unrelated to the congestion condition of port P21 of SW5 is halted.

As an attempt to overcome this problem a method is described in Japanese Patent HEI 9-149065 whereby flow control is performed by sending a "back pressure" message, to a specific terminal. That is to say, when the rate of data packet flow into an input buffer of a port of a switching hub exceeds a predetermined threshold value, then based on the address of the terminal that is the source the most recent data packet to have entered the input buffer, a pause packet is transmitted only to that specific terminal.

However when such a flow control method is utilized, the problem remains that data packets may be lost, while in addition the above-mentioned problem may also occur whereby transfer of data packets may be inhibited between terminals belonging to a group which is unrelated to the cause of input buffer congestion. The reasons for these problems will be described referring first to the example shown in FIG. 34A. This shows the configuration of FIG. 33B adapted to conform to the description in the above Japanese Patent HEI 9-149065. Here it is assumed that overflow of the input buffer of port P23 of switching hub SW2 has occurred while group #1 data packets are being transmitted to terminal A from terminal D via port P41 of switching hub SW4 and from terminal G via port P51 of the switching hub SW5. As a result, a notification message is transmitted (as a congestion notification packet) which is addressed to the terminal G, i.e., to the terminal from which a data packet was being received at the time when the congestion condition occurred.

When that notification message is received by the switching hub SW5, it responds by generating and transferring a pause packet to the port P51, to be sent to the terminal G, thereby halting transmission of packets from that terminal.

In that condition, transmission from other terminals of the switching hub SW5, such as terminal I, continues to be possible. However if for example data packets begin to be transmitted from the terminal I to terminal F of group #4, through switching hub SW2, while the congestion condition of the input buffer of port P23 of SW2 continues, then this will result in a pause packet also being sent to the terminal I. Hence, transmission from terminal I (a terminal which is not within the group which has actually caused the data congestion) will be halted.

Furthermore FIG. 34B illustrates a case in which a large number of terminals G to M which are each within the same group (group #1) are connected to respective ports of the same switching hub SW5. In this case, if input buffer overflow occurs for port P23 of hub SW2 while hub SW5 is transferring data packets from the plurality of terminals G to M to the switching hub SW2, then the switching hub SW2 will successively transmit overflow notification packets respectively addressed to each of the terminals G to M. During the time interval in which these overflow notification packets are being successively transmitted, the switching hub SW2 will continue to receive data packets from the terminals G to M, until transmission from all of these has been halted. Thus, loss of data packets due to overflow of the input buffer of port P23 may still occur.

SUMMARY OF THE INVENTION

It is an objective of the present invention to overcome the problems described above, by providing a flow control apparatus and method for transferring data packets within each of a plurality of respectively separate groups of terminals, whereby control that is applied to prevent data congestion at a port of a switching hub does not affect communication between terminals of any terminal group other than the group for which the congestion is occurring.

It is a further objective of the invention to provide a flow control apparatus and method whereby congestion control is performed by transmitting congestion notification information, conveyed by one or more congestion notification packets, from the switching hub in which the congestion is occurring, with the effect of halting further transfer of data packets from one or more terminals of that group to the output section of the port which is in the congestion status, during a predetermined time interval.

It is a further objective to provide a flow control apparatus and method whereby the aforementioned predetermined time interval is independent of respective data transmission rates of one or more successive data communication links via which packets are transmitted from a terminal that originates data packets that are determined as being a cause of the congestion.

It is a further objective of the invention to provide a flow control apparatus and method whereby respectively different types of congestion notification packets are transmitted in accordance with varying degrees of congestion.

To achieve the above objectives, the invention provides a flow control apparatus formed of a network arranged as a hierarchy of interconnected switching hubs, each switching hub having a plurality of ports with at least one port being a group-multiplexing port which transmits/receives data packets of a plurality of the terminal groups, through use of group identity information that is conveyed by each data packet. Each switching hub includes means for judging, with respect to each of the terminal groups, whether congestion is occurring for that terminal group at the output section of any port of the switching hub, and means for sending one or more congestion notification packets to terminals of the group for which the congestion is occurring. Each congestion notification packet includes pause time information, which determines the duration of a halt in transferring data packets from a terminal of the specified terminal group to the output section of the port which is in the congestion status.

According to one aspect of the invention, the congestion is judged as being one of a plurality of successively increasing degrees of congestion, such as first and second degrees. When the first degree of congestion is detected at a port of a switching hub, an individual congestion notification packet is generated and transmitted to a specific terminal which has been determined as causing the congestion condition. When the second degree of congestion is detected at a port of a switching hub, group-specific congestion notification packets are generated and transmitted from each of the ports of that hub which are connected to terminals of the group that has been determined as causing the congestion condition.

Specifically, each of the individual congestion notification packets contains the address of a specific terminal, as the destination of the packet, together with information identifying the terminal group to which that terminal belongs. Each group-specific congestion notification packet contains information identifying a specific terminal group, and contains a broadcast address as the destination address.

According to one preferred embodiment of the invention, each switching hub is configured such that when a congestion notification packet is received at the input section of a port, transmission of data packets for the terminal group identified in the received packet, from the output section of that port, is halted during an interval that is determined based on the pause time information contained in the received congestion notification packet.

According to another preferred embodiment, each switching hub includes means functioning when a congestion notification packet is received at a first port of that hub, to determine a transfer port for that congestion notification packet. If the transfer port is a group-multiplexing type of port, then information contained in said received congestion notification packet is used to generate a corresponding congestion notification packet containing a new pause time value, to be transmitted from the transfer port. However if the transfer port is not a group-multiplexing port (e.g., is connected to a data communication link which only conveys data packets of a single terminal) then the information contained in said congestion notification packet is used to generate a pause packet, containing a new pause time value, to be transmitted from the transfer port.

In the case of an individual congestion notification packet being internally generated in a switching hub in response to occurrence of congestion at a port of that hub, means are provided whereby a calculated pause time value is obtained, to be inserted in the congestion notification packet, by modifying a fixedly predetermined reference pause time value (which would be appropriate for halting transfer of data packets to the output section of the congested port if data were to be transferred from the congestion origin terminal to the congested port at some fixedly predetermined reference data transmission rate) in accordance with any difference between the actual data transmission rate of the data communication link of the port from which the congestion notification packet is to be transmitted and the reference data transmission rate.

Preferably, the reference pause time value is multiplied by the ratio of the actual data transmission rate at which the congestion notification packet will be transmitted from the switching hub to the reference data transmission rate, to obtain the calculated pause time value.

In addition, when an individual congestion notification packet is received at a port of a switching hub, a new pause time value which is then derived (to be inserted in a corresponding individual congestion notification packet or pause packet that will be transmitted from a specific transfer port), is preferably derived by multiplying the pause time value contained in the received congestion notification packet by the ratio of the data transmission rate of the data communication link of the transfer port for the received packet to the data transmission rate of the data communication link of the port which received the congestion notification packet. In that way, it is ensured that the actual time interval for which transfer of data packets to the output section of the congested port is halted can be fixedly predetermined, and independent of various different data transmission rates of communication links via which these data packets are transmitted.

Furthermore in the case of a group-specific congestion notification packet being internally generated to be transmitted from a port of a switching hub in response to congestion occurrence at another port of that hub, a calculated pause time value is derived in the same way as for an individual congestion notification packet. However that calculated pause time value is then randomized, by adding thereto a non-zero positive random number. In that way it is ensured that when a switching hub transmits a plurality of group-specific congestion notification packets from respective ports thereof, these will convey respectively different pause time values.

In addition, when such a group-specific congestion notification packet is received at a port of a switching hub, and a transfer port for transmitting one or more corresponding group-specific congestion notification packets, respective new pause time values are derived for each of these corresponding group-specific congestion notification packet in the same manner as for a received individual congestion notification packet. However each such new pause time value is then randomized. It can thereby be ensured that when a plurality of group-specific congestion notification packets are internally generated in a switching hub and transmitted from respective ports of that hub, thereby causing a halt of transmission of data packets from each of a plurality of terminals of the specified group, transfer of data packets from these terminals into the output section of the congested port will resume at respectively different times. There is therefore a reduced possibility that a previously congested port may immediately re-enter the congested status, when transfer of data packets to the output section of that port is resumed.

According to another aspect of the invention, each switching hub is configured to operate such that while transfer of data packets of a specific terminal group to the output section of a port is halted, as a result of a group-specific congestion notification packet having been generated and transmitted from that switching hub, no further congestion notification packet will be generated in response to any congestion notification packet that is received during a fixed time interval following transmission of the group-specific congestion notification packet. In that way, unnecessary generation of congestion notification packets, e.g., in response to data packets which continue to be read out from a data buffer of a port of another switching hub after transfer of data packets to that buffer has been halted by the effect of the group-specific congestion notification packet, can be prevented.

According to one embodiment of the invention, a group-multiplexing port of a switching hub has an output section provided with a plurality of data output buffers, respectively corresponding to the plurality of terminal groups, and the congestion judgement means of the switching hub judges, respectively separately for each of these data output buffers, whether first-degree congestion or second-degree congestion has occurred in that buffer, based upon respective levels of utilization of the data output buffers.

Alternatively, a group-multiplexing port of a switching hub has an output section provided with a single data output buffer which is used in common for data packets of all of the terminal groups. In that case, the congestion judgement means of the switching hub monitors the respective rates of data transfer into the data output buffer, for the various terminal groups, and performs congestion judgement for the respective terminal groups based upon the corresponding transfer flow rates.

More specifically, occurrence of a first degree of congestion is detected based upon these group-specific transfer flow rates into the common data output buffer, while a second degree of congestion preferably is detected based upon the level of utilization of that output buffer.

Furthermore with such a configuration of a switching hub, means are preferably provided in the switching hub whereby when it is judged that the second degree of congestion has been reached for the common data output buffer, group-specific congestion notification packets are transmitted from the switching hub to all terminal groups which are connected such as to be capable of transmitting data packets that would be transferred to that data output buffer.

According to another aspect, each switching hub is preferably configured such that when one or more group-specific congestion notification packets are internally generated and transmitted from respective ports of the switching hub in response to occurrence of congestion at a port, and if the congestion condition is not relieved after a specific time interval has elapsed, these congestion notification packets are retransmitted.

BRIEF DESCRIPTION OF THE DRAWINGS

FIG. 4 shows an example of a congestion status table which is held in a switching hub of the first embodiment;

FIG. 7 shows an example of an equation used to calculate a randomized pause time value that is inserted in a group-specific congestion notification packet;

FIG. 8 shows an example of an equation used to calculate a pause time value that is inserted in an individual congestion notification packet, and also to calculate a pause time value which is randomized by using the equation of FIG. 7;

FIG. 9 is a flow diagram of the operation of a packet receiving control section of a port of a switching hub of the first embodiment, shown in FIG. 2;

FIG. 10 is a flow diagram of the operation of a transfer control section of a port of a switching hub of the first embodiment, shown in FIG. 2;

FIG. 18 shows an example of a transfer rate table which is held in a switching hub of the second embodiment;

FIG. 19 shows an example of a congestion status table which is held in a switching hub of the second embodiment;

FIG. 28 shows an example of an output management table which is held in a switching hub of the third embodiment;

FIG. 32 is a flow diagram of the operation of a packet transmission control section of a port of a switching hub of the third embodiment;

DESCRIPTION OF PREFERRED EMBODIMENTS

Figure 1A:
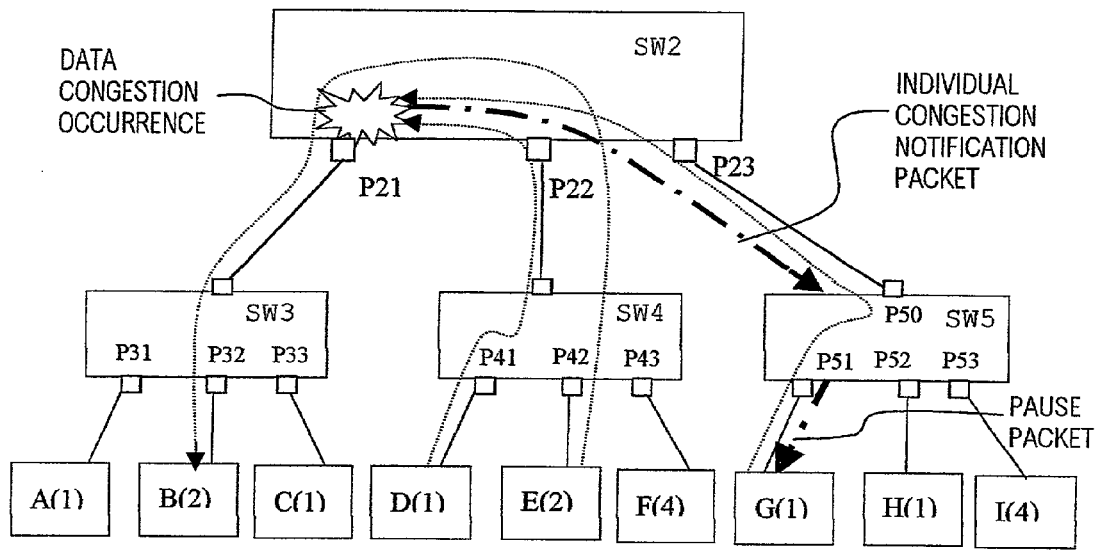
FIG. 1A is a conceptual system diagram for describing the operation of a first embodiment of a flow control apparatus, for the case of an individual congestion notification packet being generated.

FIG. 1A is a diagram illustrating the general features of a first embodiment of a flow control apparatus according to the present invention. The features of the embodiment can be summarized as follows:

(a) Data congestion judgement is applied, at each port of a switching hub, separately for respective terminal groups.

(b) Congestion notification packets are transmitted only to terminals of a group for which data congestion is judged to have occurred.

(c) Each port is provided with data output buffers respectively corresponding to the respective terminal groups, and congestion judgement is performed, at each port, based on the utilization levels of the buffers respectively corresponding to the various terminal groups (where "utilization level" signifies the amount of data currently held in a buffer) in relation to a predetermined threshold value of maximum utilization level.

(d) The congestion status of a port is judged in two stages, i.e., two successively increasing degrees of congestion, with flow control being applied to data packets from a single terminal, or from a plurality of terminals of the same group, depending upon the degree of congestion that is determined.

In FIG. 1(1), a network is shown formed of a plurality of switching hubs SW2 to SW5 arranged in a hierarchy. In this example, a switching hub SW2 functions as the backbone hub for a set of switching hubs SW3, SW4, SW5 which are connected to a plurality of terminals A to I as shown, to function as respective front-end hubs. The terminals A to I are respectively identified as belonging to various terminal groups, by assigned group identifiers (group #1, #2, . . . ) as indicated by the numerals in parentheses.

In this example, the ports P21, P22, P23 of the switching hub SW2 are connected directly via communication links to respective ports of the switching hubs SW3, SW4, SW5. The terminals A to I are similarly connected directly via communication links to respective ones of the ports P31, P32, P33 of switching hub SW3, ports P41, P42, P43 of switching hub SW4, and ports P51, P52, P53 of the switching hub SW5, in the configuration shown in FIG. 1A.

In that way, each of the terminals A to I is individually connected to a specific port of the front-end switching hubs SW2 to SW5, while in addition the plurality of terminal groups are handled by multiplexed operation of the backbone hub SW2 through use of the group identifiers. The terminal D connected to the switching hub SW4 and the terminals G, H which are connected to the switching hub SW5 belong to the same terminal group (group #1) as terminal A which is connected to switching hub SW3, while the terminals E and I, which are connected to the switching hubs SW4, SW5 respectively, belong to two other terminal groups.

With this embodiment, each of the output ports of a switching hub is provided with a set of data output buffers, with the buffers in each set being assigned to respectively corresponding ones of the groups. It will be assumed that terminal G and terminal D of group #1 are sending data packets via the switching hubs SW5, SW4 respectively to terminal A, via the switching hub SW2, and that the rate at which data packets originating from terminals G and D are transferred into the group #1 data output buffer of port P21 of hub SW2 exceeds the rate at which data packets can be transmitted out of that port. As a result, the predetermined threshold level of utilization of that data output buffer is exceeded. When this occurs, the switching hub SW2 applies flow control only to transmission of data packets from terminal group #1, as described in the following.

Specifically, when a predetermined first-stage threshold level of utilization of a data output buffer of a port of switching hub SW2 is exceeded, then a halt is applied for a predetermined time interval to further transmission of data packets from the terminal that was the source of the data packet (referred to in the following as the congestion origin packet) whose transfer into the data output buffer resulted in the threshold level being exceeded. In the following, such a source terminal will be referred to as a congestion origin terminal, and the group to which that terminal belongs will be referred to as the congestion origin group. In addition, a port to which a received packet is to be transferred within a switching hub (to be transmitted out of that port) will be referred to as the transfer port for that packet.

In the of FIG. 1A it will be assumed that the first-stage congestion threshold is exceeded, for the port P21 data output buffer that is assigned to terminal group #1, when a data packet transmitted from terminal G is written into that buffer. As a result, a congestion notification packet addressed to terminal G (determined as being the congestion origin terminal) is transmitted from port P23 of hub SW2 (i.e., the receiving port for the congestion origin packet) to the front-end switching hub SW5. In response, hub SW5 transfers a pause packet to the port P51, to be transmitted to the congestion origin terminal G.

As a result, only the transmission of packets from terminal G is halted, for a time interval determined based on the pause time value specified in the congestion notification packet.

The type of congestion notification packet which is transmitted in the above case, which is addressed to one specific terminal, will be referred to as an individual congestion notification packet. With this embodiment, the congestion condition is judged at each port, for each terminal group, based upon the utilization level of the data output buffer corresponding to that group.

In that condition, communication within the other terminal groups can proceed, irrespective of the flow control which is being applied to the group #1 terminal G. Transmission of data packets from, for example, terminal E (of group #2) to terminal B will not be affected.

It is a basic feature of this embodiment as described in detail hereinafter that, when such a pause packet is supplied, it conveys to the congestion origin terminal a pause time value that is appropriate, irrespective of the actual respective data transfer speeds of the links between the network layers, e.g., between port P23 and the corresponding port of switching hub SW5, or between port P51 and the terminal G.

Next, referring to Fig. 1B, the condition will be described whereby a second-stage threshold value of the utilization level of a data output buffer of a port is exceeded, with that threshold value being referred to as the second-stage congestion threshold value, which is higher than the first-stage congestion threshold value. In this case, congestion notification packets are sent to respective terminals of the congestion origin group.

The operation will be described for the case in which the second-stage congestion threshold value has been exceeded for the port P21 output buffer of the backbone switching hub SW2, due to the transmission of data packets from the group #1 terminals D and G addressed to terminal B. In this case, the switching hub SW2 generates and transfers respective group-specific congestion notification packets to each of its ports which are connected to terminals of group #1, other than the port P21 which is in the congestion status, i.e. these packets are transferred to each of ports P22, P23, to be transmitted therefrom. When these group-specific congestion notification packets are received by the switching hubs SW4, SW5, these transfer respective pause packets to the ports P41, P51, P52, to be transmitted to the terminals D, G and H respectively of the congestion origin group #1. Further transmission of data packets from each of these terminals is thereby halted during a specific pause time interval, determined based on a pause time value conveyed by the corresponding pause packet. However in this case, respectively different pause time intervals are established for the various terminals, as described in detail hereinafter.

It will be understood that by such a method, when data congestion occurs at a port to which data packets from a plurality of terminals of one group are being transferred to be transmitted therefrom, transmission of data from all of the terminals of that group can be halted at once, by a single control operation. Hence, packet loss by the backbone switching hub SW2 can be prevented.

While the halting of transmission from all terminals of group #1 is in force, then in the same way as for the example of FIG. 1(1), transmission of packets can still be performed between terminals of other groups. It can thus be understood that when the second-stage congestion threshold value is exceeded and group-specific congestion notification packets are accordingly generated, these do not affect the operation of terminals other than those of the congestion origin group.

Figure 2:
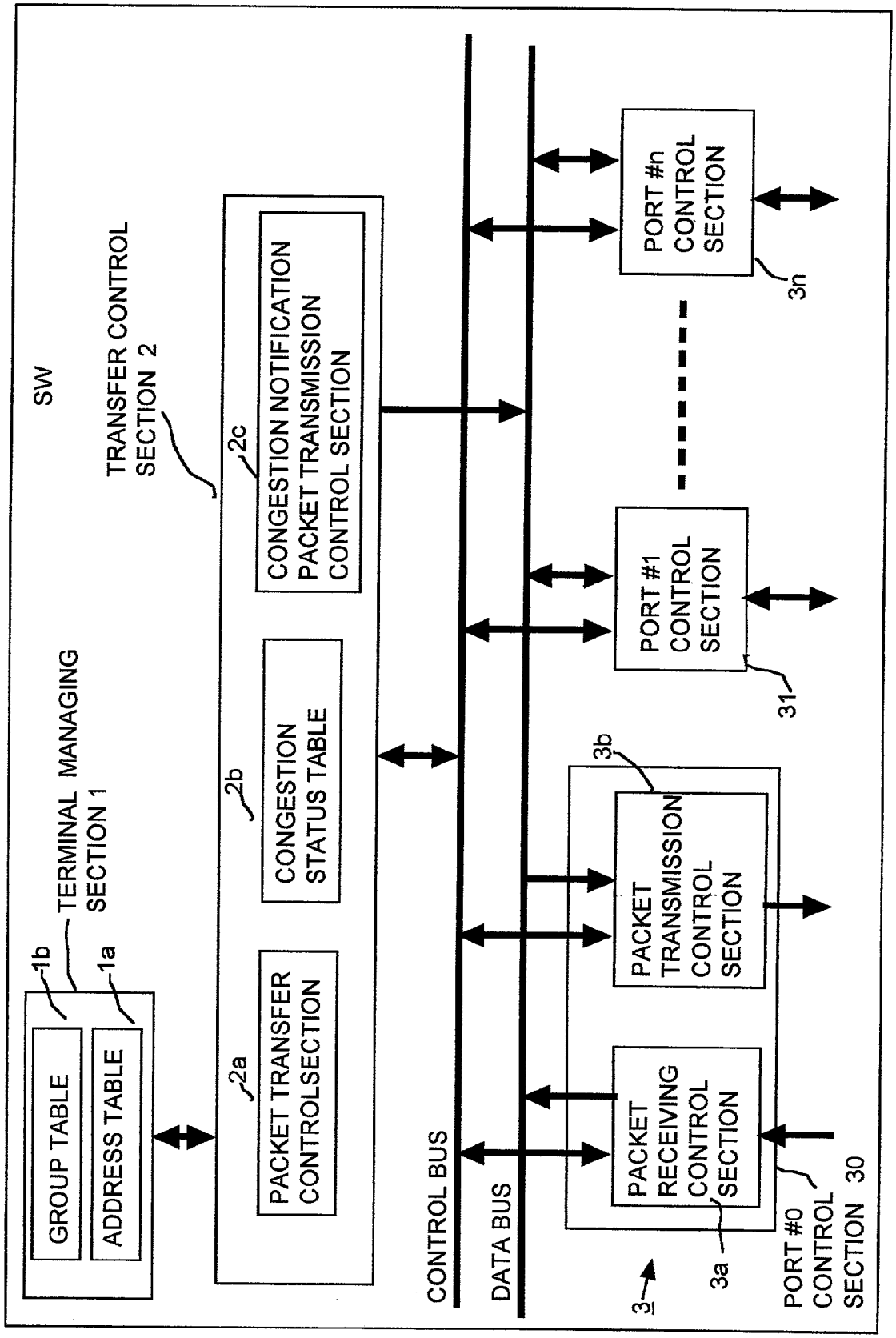
FIG. 2 is a general block diagram showing details of a switching hub of the first embodiment.

The configuration and operation of the switching hubs of this embodiment will be described in more detail in the following. FIG. 2 is a block diagram showing the configuration of a switching hub SW of the embodiment. The switching hub SW has a terminal managing section 1 which manages respective addresses of terminals based on use of an address table 1a and manages respective terminal groups based on use of a group table 1b, and a transfer control section 2. The transfer control section 2 is made up of a packet transfer control section 2a which controls the transfer destinations of packets, a congestion status table 2b which registers data congestion statuses corresponding to respective terminal groups, for each port of the hub, and a congestion notification packet transmission control section 2c which controls the transmission of congestion notification packets.

The switching hub SW further includes a set of port control sections 3, made up of port #0 control section 30 to port #n control section 3n (i.e., respectively implementing the operational functions of ports #0 to #n). Each of these port control sections 3 is made up of a packet transfer control section 3b and a packet receiving control section 3a, as shown in detail in FIG. 3 for the port #0 control section. The transfer control section 2 and the set of port control sections 3 are connected via a control bus and a data bus. Each time a packet is received by the packet receiving control section 3a of a port, the packet receiving control section 3a decodes the packet address, and judges whether the received packet is a data packet, a congestion notification packet, or a pause packet.

Figure 3:
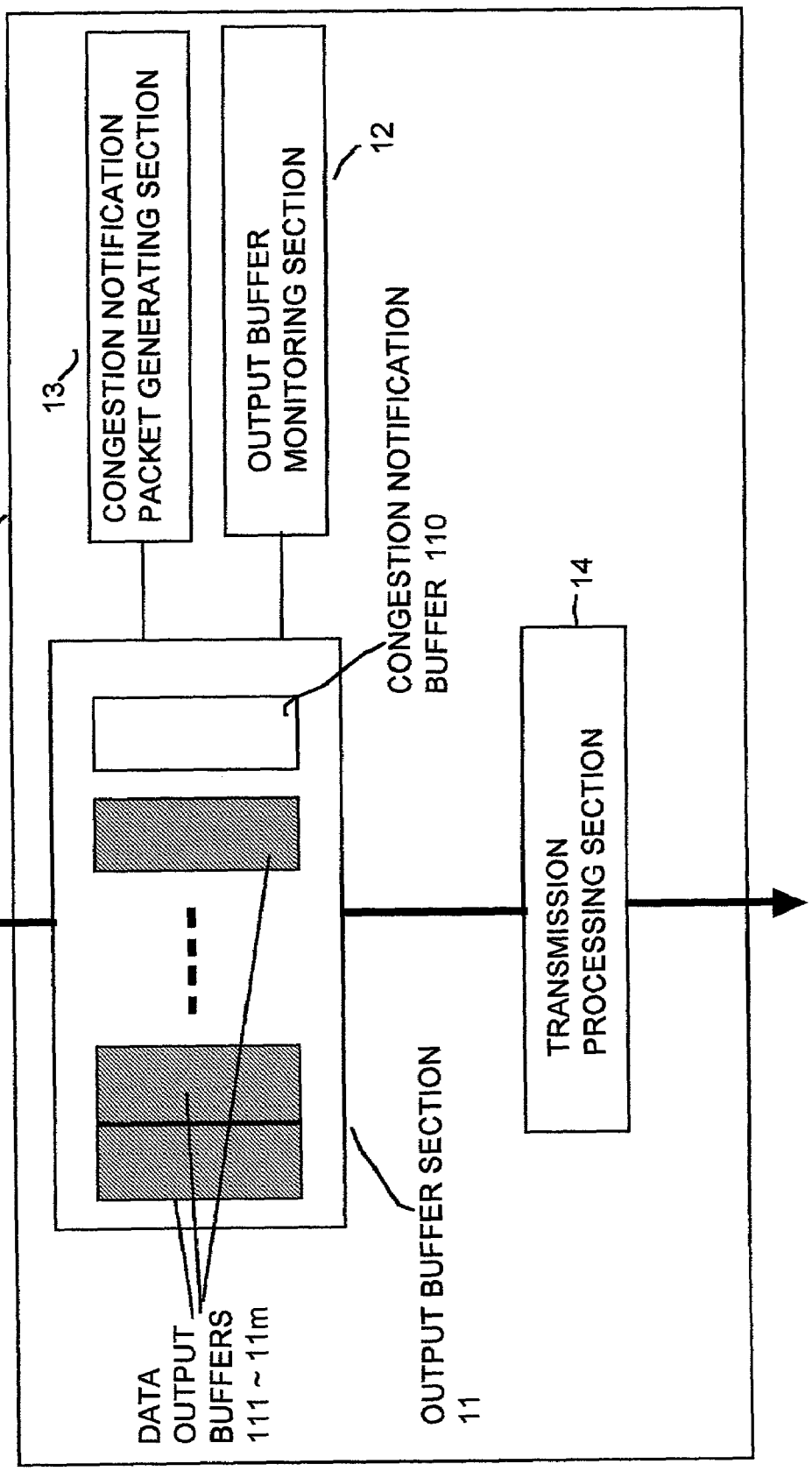
FIG. 3 is a block diagram of a packet transmission control section of a port of a switching hub of the first embodiment.

FIG. 3 shows the configuration of a packet transmission control section 3b of a port which handles data packets from a plurality of groups by multiplexing operation. As shown, this has an output buffer section 11 formed of a set of m data output buffers 11l to 11m, for outputting data of m terminal groups #1 to #m respectively, and a congestion notification buffer 110 which is used to temporarily store and output a congestion notification packet. Each packet transmission control section 3b also includes an output buffer monitoring section 12 for monitoring the respective utilization levels of the data output buffers 11l to 11m, a congestion notification packet generating section 13 for generating a congestion notification packet when notification to do so is received from the transfer control section 2, and a transmission processing control section 14 for controlling the sequence of outputting congestion notification packets and data packets of respective terminal groups from that port.

In the case of a port which handles data packets of only a single group (such as each of the ports P31, P32, . . . P53 of the front-end switching hubs SW3, SW4, SW5 in the example of FIG. 1A or 1B) the configuration of the packet transmission control section of a port is identical to that shown in FIG. 3, except that only a single data output buffer is utilized. In addition, pause packets are generated by the congestion notification packet generating section 13 of such a port as described hereinafter, and set into the congestion notification buffer 110. In other respects, the operation is as described above referring to FIG. 3.

FIG. 4 shows the configuration of the congestion status table 2b. Based on that table, the congestion status (expressed by a 2-bit binary value, which is designated Flow Status) for each of the groups #1 to #m and each of the ports #1 to #n in each group is managed, together with the status (expressed by a 1-bit flag referred to as Timer Status) of a timer whose operation is started when a group-specific congestion notification packet is sent to a terminal of that group, and which will be referred to in the following as the retransmission timer (since it defines an interval during which monitoring is performed to determine whether a group-specific congestion notification packet has to again be transmitted).

For each of the groups, the corresponding Flow Status value has the following significance in relation to a port (with a binary number having more than one digit being indicated by the suffix "b"):

00b signifies that the port is not connected to any of the terminals of the group concerned;
01b signifies that the port is free from congestion;
10b signifies that the port is in the first-stage congestion status, so that an individual congestion notification packet is to be transmitted;
11b signifies that the port is in the second-stage congestion status, so that group-specific congestion notification packets are to be transmitted.

For each of the groups, the corresponding Timer Status value has the following significance in relation to a port:

1 signifies that the retransmission timer is in operation;
0 signifies that the retransmission timer is not in operation.

Figure 5:
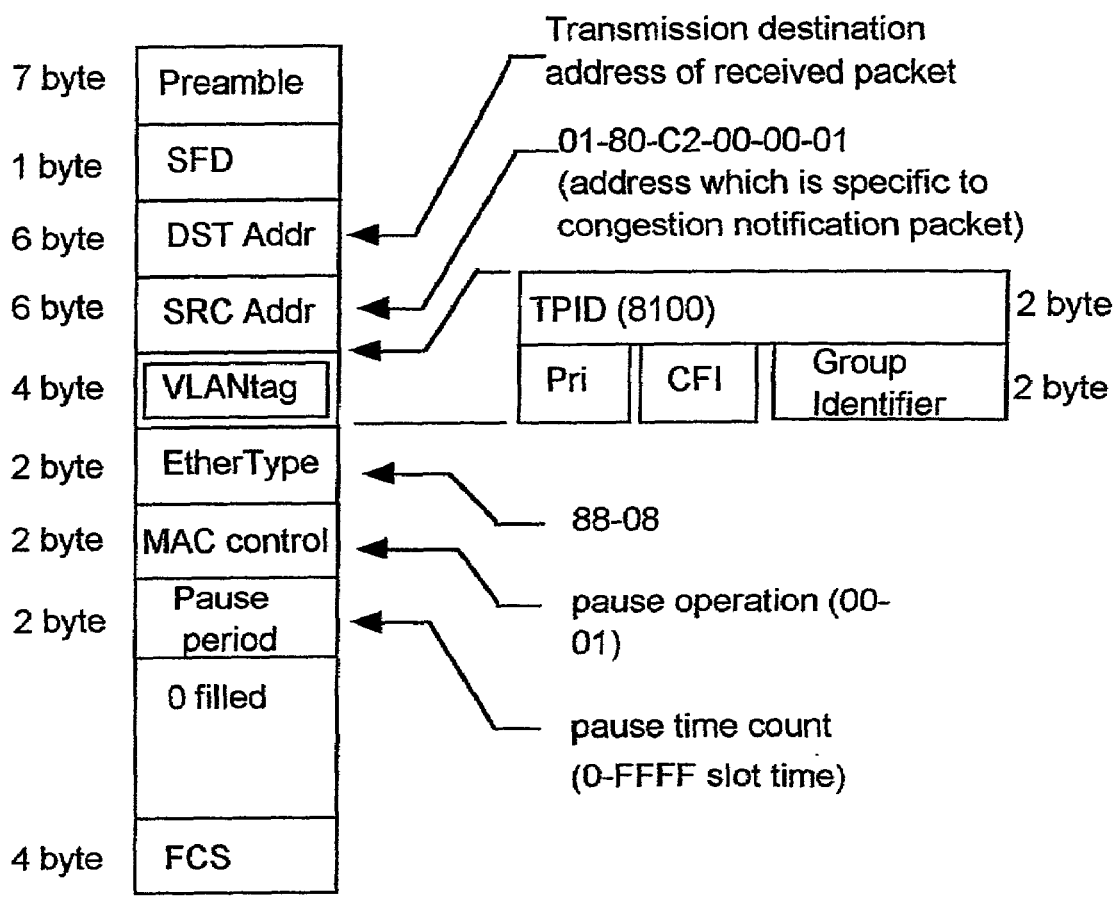
FIG. 5 shows the MAC frame format of an individual congestion notification packet.

FIG. 5 shows the MAC frame format of an individual congestion notification packet. This is in accordance with the frame format of the Ethernet II (T.M) and IEEE802.3 standards. In addition, the group identifier is in accordance with the standard format specified by IEEE802.1Q. In the congestion notification packet, the MAC address of a terminal to which flow control is to be applied is specified as the destination address of the packet. In a data packet, the transmission source address specified in the packet is the MAC address of a source terminal, however in the case of a congestion notification packet as shown in FIG. 5, a unique address is specified as the source address.

Figure 6:
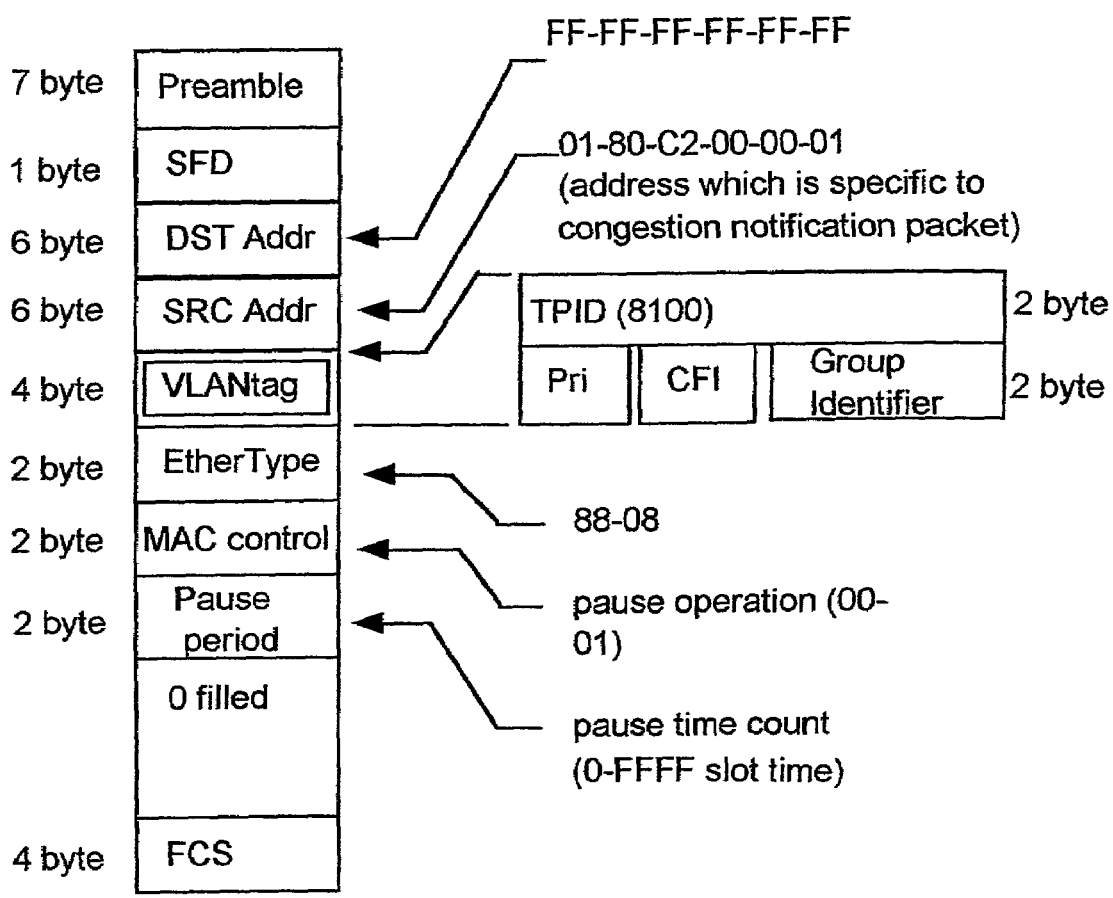
FIG. 6 shows the MAC frame format of a group-specific congestion notification packet.

FIG. 6 shows the MAC frame format for a group-specific congestion notification packet. With such a packet, a broadcast address is used as the destination address, while the remaining contents are the same as for the congestion notification packet shown in FIG. 5, i.e., including a group identifier.

A pause packet is generated with a format (not shown in the drawings) that is in accordance with the IEEE802.3x specifications.

Referring again to the example of FIG. 1A, when it is detected that congestion has occurred at port P21, an individual congestion notification packet addressed to the terminal G is generated and transmitted from port P23, conveying a pause time value derived as described in the following. Such an operation will be referred to as "internal generation" of a congestion notification packet. When that congestion notification packet is received at switching hub SW5, a new pause time value is derived, based on the received pause time value, to be inserted in a pause packet which is generated by the congestion notification packet generating section 13 of the packet transmission control section 3b of port P51 and is transmitted from that port, with that new pause time value having been modified in accordance with the respective data transfer speeds of the links between port P23 and hub SW5 and between port P51 and the terminal G. Similar generation of modified pause time values occurs in the case of group-specific congestion notification packets being generated.

More specifically, each switching hub has stored therein, as fixedly preset values, first and second reference pause time values (referred to as pause time value A and pause time value B) for use in internal generation of an individual congestion notification packet and group-specific congestion notification packets respectively, in conjunction with a reference value of port speed (i.e., data link speed). The pause time value A is a nominal value, which would be appropriate as the duration for halting data transmission from a congestion source terminal if the data transfer rate between that terminal and the switching hub (e.g., between port P23 and the terminal G in the example of FIG. 1A) were identical to a predetermined reference data transmission rate, such as 10 Mbps.

The pause time value B has a similar significance, in the case of generating a group-specific congestion notification packet.

FIG. 8 shows an example of a suitable derivation equation, as equation (2), for obtaining the value of pause time (PauseTime$_x$) to be inserted in an individual congestion notification packet or a pause packet generated at a port, in the case of internal generation.

With the example of port P23 of hub SW2 in FIG. 1A, the following information would be supplied as packet generating information to the congestion notification packet generating section 13 of the packet transmission control section 3b of port P23 for use in the calculation of equation (2):

(a) the aforementioned reference port speed (e.g., 10 Mbps), for use as the value PortSpeed$_{in}$, (b) the predetermined pause time value A, for use as the value PauseTime$_{in}$, (c) the speed of the data link between port P23 and switching hub SW5, for use as the value PortOutputSpeed, and (d) information specifying that an individual congestion notification packet is to be generated.

When a group-specific congestion notification packet is to be internally generated at a port (e.g., as for port P23 of hub SW2 in FIG. 1B) the following information is supplied as packet generating information to the congestion notification packet generating section 13 of that port, for use in the calculation of equation (2):

(a) the aforementioned reference port speed (e.g., 10 Mbps), for use as the value PortSpeed$_{in}$, (b) the predetermined pause time value B, for use as the value PauseTime$_{in}$, (c) the speed of the data link between port P23 and switching hub SW5, for use as the value PortOutputSpeed, and (d) information specifying that a group-specific congestion notification packet is to be generated.

Figure 1B:
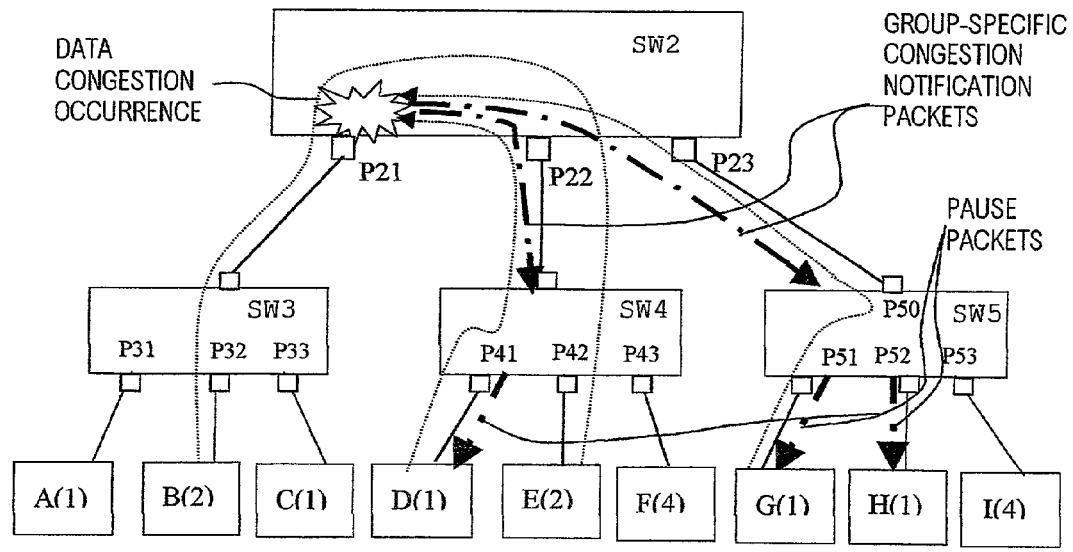
FIG. 1B is a conceptual system diagram for describing the operation of the first embodiment, for the case of a plurality of group-specific congestion notification packets being generated.

In the case of generating a congestion notification packet or a pause packet to be transmitted from a port of a switching hub in response to a received congestion notification packet (for example as in the case of port P51 of FIG. 1A in response to the congestion notification packet received at port P50 of hub Sw5), the packet generating information which is supplied to the congestion notification packet generating section 13 of the transmission port, to be used in equation (2) of FIG. 8, is as follows, in addition to information specifying whether a group-specific congestion notification packet or individual congestion notification packet is to be generated:

(1) the pause time value conveyed by the received congestion notification packet, to be used as the value PauseTime$_{in}$, (2) the speed of the port which received the congestion notification packet (i.e., the transmission rate of the data link between that port and the higher-level port to which it is linked, such as between ports P50 and P23 in the example of FIG. 1B), for use as the value PortSpeed$_{in}$, and (3) the speed of the data link connected to the port at which the new congestion notification packet or pause packet is to be generated (such as the data transmission rate of the link between port P51 and the terminal G, in the example of FIG. 1B) for use as the value PortOutputSpeed.

If a pause packet or individual congestion notification packet is to be generated, then the resultant value PauseTime$_x$ obtained from the calculation of equation (2) of FIG. 8 is directly inserted into the newly generated packet.

FIG. 7 shows an example of an equation, as equation (1), for deriving a randomized pause time value (PauseTime$_{set}$) to be inserted in a group-specific congestion notification packet. When a group-specific congestion notification packet is to be internally generated at a port (for example as in the case of port P23 of switching hub SW2 in FIG. 1B), this equation randomizes a value of pause time (PauseTime$_x$) which is derived using equation (2) of FIG. 8, with the predetermined pause time value B having been used as the value PauseTime$_{in}$ in that calculation. The resultant pause time value PauseTime$_{set}$ obtained from equation (1) of FIG. 7 contains a random amount which constitutes up to a maximum of approximately 30% of the pause time.

When a group-specific congestion notification packet is to be generated at a port in response to a group-specific congestion notification packet having been received at the switching hub which contains that port, then the pause time value which is contained in the received group-specific congestion notification packet is supplied, in the packet generating information, as the value to be used as PauseTime$_{in}$ in equation (2) of FIG. 8. The resultant pause time value is used as PauseTime$_x$ in equation (1) of FIG. 7, to obtain a randomized value which is inserted in the newly generated group-specific congestion notification packet.

FIG. 9 is a flow diagram for illustrating packet receiving processing operation executed by the packet receiving control section 3a of a port of a switching hub of this embodiment. Firstly, when a packet is received, the packet receiving control section 3a of the receiving port analyzes the packet (step S1). If it is found to be a pause packet, then the packet transmission control section 3b of the receiving port is notified of that, and of the pause time value specified in the received packet, then the packet is discarded (steps S2, S9, S10).

If it is found not to be a pause packet, then the destination address, the transmission source address, and the group identifier information from the packet are transferred to the transfer control section 2 (steps S2 to S3). Based on that information, the transfer control section 2 looks up the tables held in the terminal managing section 1, to select the transfer port for that packet, and notifies that information to the packet receiving control section 3a of the receiving port (steps S3, S4). In response, if the received packet is found to be a data packet (i.e., a Y decision in step S5) then that packet receiving control section 3a transfers the packet to the output buffer (in the transfer port, determined in step S4) assigned to the group which is identified in the received packet (steps S3, S4, S5 to S6).

If the received packet is not found to be a data packet in step S5 (i.e., must be a congestion notification packet), then a set of packet generating information (as shown in FIG. 9) is derived from that received packet and transferred to the congestion notification packet generating section 13 of the packet transmission control section 3b of the transfer port for the packet, whereby a new congestion notification packet is written into the congestion notification buffer 110 of that port (step S7), if that port operates on data packets of a plurality of terminal groups by multiplexing operation.

If however the transfer port does not perform multiplexed processing of packets (such as port P51 in hub SW5 in FIG. 1A), then in that case the congestion notification packet generating section 13 of the transfer port uses the packet generating information to write a pause packet into the congestion notification buffer 110 of that port, with the pause packet then being assigned priority for being transmitted from that port.

The operation of the transfer control section 2 of a switching hub SW at that time, i.e. to perform packet transfer within the switching hub, is shown in the flow diagram of FIG. 10. Firstly, transfer processing for a received unicast packet (i.e., a packet addressed to a single terminal) will be described. When the transfer control section 2 obtains the header information of the received packet from the packet receiving control section 3a (step S11) of the receiving port, the address table 1a of the terminal managing section 1 is referred to, to determine the transfer port for the received packet, and this information is then notified to the packet receiving control section 3a of the receiving port, while in addition the packet header information, and information specifying the transfer port and the port which received the packet, are notified to the congestion notification packet transmission control section 2c (steps S12 to S13, S13–S16).

The transfer processing for a received multicast packet shown in FIG. 10 is as follows. When the packet receiving control section 2a of a port extracts the header information from a multicast packet that is received at that port (step S11), the identities of the respective transfer ports for the packet are obtained from the group table 1b, and a list of these ports, referred to in the following as a transfer port list, is generated (S12 to S17). Next, the congestion statuses of the ports in that list are judged, using the congestion status table 2b (steps S18 to S19). Any port which is found to be in a congestion status with respect to the terminal group corresponding to the received packet is then deleted from the transfer port list (step S20), and the resulting list is notified to the packet receiving control section 3a of the receiving port (step S16). Hence, the packet receiving control section 3a of a port of a switching hub only transfers a received multicast data packet (to ports of that hub, to be transmitted therefrom) to those ports which are free from congestion.

The overall processing whereby congestion notification packets are transmitted, under various different congestion conditions, will be described referring to the flow diagram of FIG. 11. As described above, when a data packet is received by the packet receiving control section 3a of a port, transfer information concerning the packet is supplied to the congestion notification packet transmission control section 2c from the packet transfer control section 2a, i.e., packet header information, and information specifying the receiving port and the transfer port(s) for that packet (step S31). In response, the congestion notification packet transmission control section 2c uses the congestion status table 2b to judge the respective congestion statuses of these transfer ports. Specifically, for each of these ports, the congestion notification packet transmission control section 2c determines (from the congestion status table 2b) the Flow Status value for the group corresponding to the received packet, in steps S32, S34, and the corresponding Timer Status value, in step 35.

For each of the transfer ports, the following processing is performed. If it is found that the Flow Status for the group corresponding to the received packet is 01b, then the processing executed by the congestion notification packet transmission control section 2c for that port is ended (steps S34→S41). If it is found that the Flow Status is 10b, then the congestion notification packet generating section 13 of the packet transmission control section 3b of the port which received the packet is notified that the port is to transmit an individual congestion notification packet, and is also provided with packet generating information for an individual congestion notification packet, consisting of the destination address for the packet, the group identifier (i.e., of the destination terminal), the aforementioned reference pause time value A which is appropriate for calculating a pause time value to be inserted in an individual congestion notification packet, the aforementioned reference port speed (e.g. 10 Mbps), and the outputs speed of the receiving port, i.e., the flow rate of data transmitted from that port (steps S32→S33).

If the Flow Status is 11b (a Y decision in step S34) while the Timer Status is 0 (a Y decision in step S35), that is to say, a first group-specific congestion notification packet is to be transmitted due to occurrence of second-stage congestion, then a list of all of the ports in the switching hub SW which are connected to terminals of the congestion origin group is generated (for example, the ports P22, P23 which are connected to group #1 terminals, in FIG. 1B) (step S36). A command is sent to each congestion notification packet generating section 13 of all of these ports (other than the port where the congestion is occurring) designating that a group-specific congestion notification packet is to be generated, together with packet generating information including the destination address information (i.e., broadcast address), the group identifier, the aforementioned reference pause time B which is used to calculate a pause time value to be inserted in a group-specific congestion notification packet, the nominal port speed (e.g., 10 Mbps), and the actual port speed, i.e., speed of the data link to which that port is connected (step S37).

In that way, for example, group-specific congestion notification packets are transmitted from the ports P22, P23 of hub SW2, addressed to each of the group #1 terminals D, G, H, in response to the congestion of port P21 of hub SW2, in the example of FIG. 2. Pause packets (conveying respectively different pause time values, due to the randomization performed as described above using the equation of FIG. 8) are thereby transmitted concurrently from the ports P41, P51, P52 of hubs SW4, SW5 to halt transmission from each of the group #1 terminals D, G, H. Transmission of packets directed to the congested one of the data output buffers of port P21 is thereby rapidly halted, so that the buffer utilization capacity can be quickly reduced.

Figure 11:
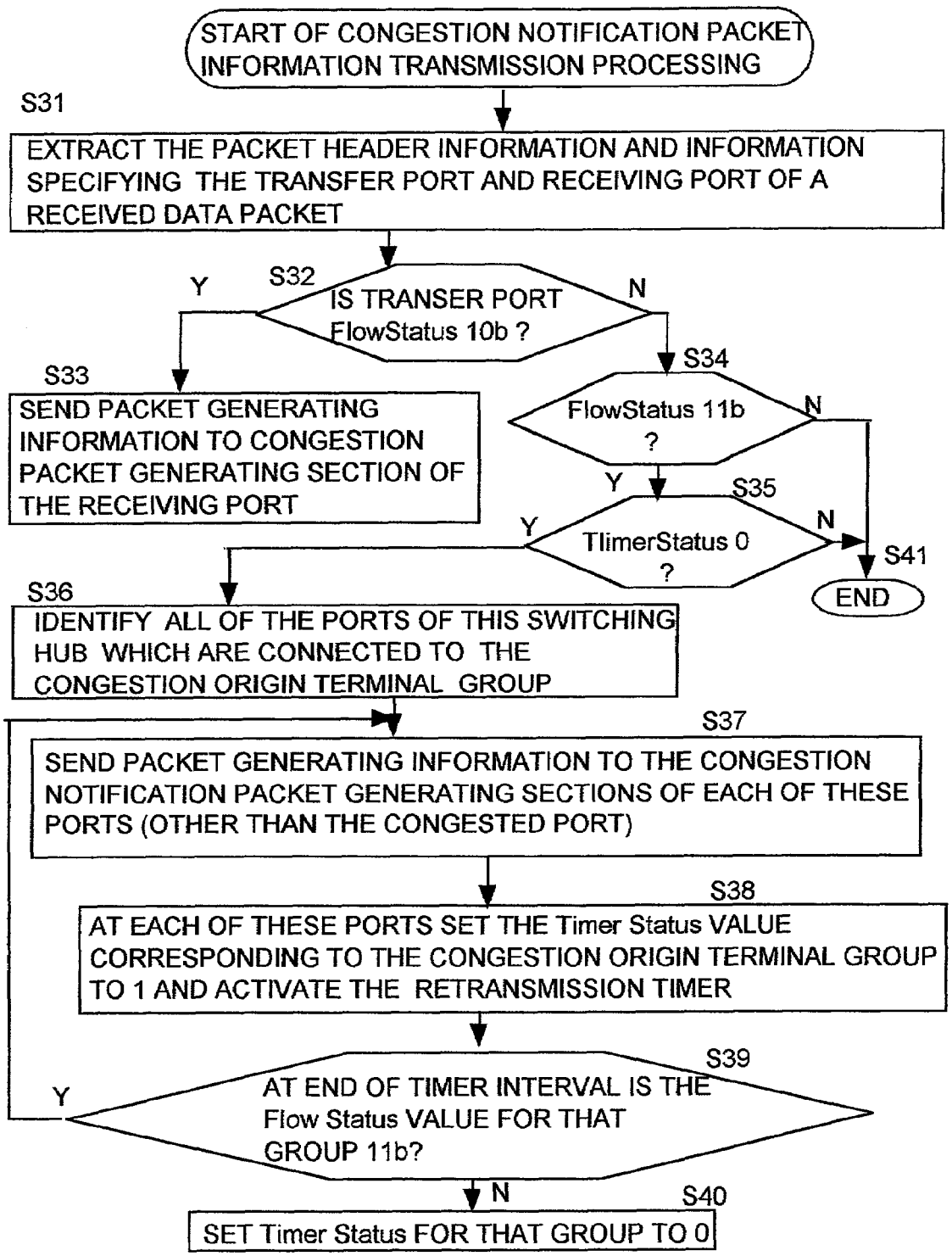
FIG. 11 is a flow diagram of the operation of a congestion notification packet transmission control section of a switching hub of the first embodiment, shown in FIG. 2.

Following step S37 in FIG. 11, the aforementioned retransmission timer is set in operation to measure an elapsed interval. The duration of that timer interval is calculated such as to be shorter than the minimum value of the randomized quantity PauseTime$_{set}$ that is obtained when the predetermined pause time value B (described above) is inserted as PauseTime$_x$ in equation (1) of FIG. 7, i.e., the timer interval is made less than 1.05 times the pause time value B. This will ensure that the timer interval will not elapse until after data begins to be again transferred to the (previously) congested port, from each of the terminals which had been set in the paused condition.

When a retransmission timer is set in operation, the Timer Status value corresponding to the group concerned, in the congestion status table 2b of the switching hub containing the port that is in the congested status, is set to 1 (step S38). If at the end of the timer interval the Flow Status value corresponding to the group concerned has become 01b, then the corresponding Timer Status value in the congestion status table 2b is set to 0, since the buffer utilization level of the previously congested data output buffer has been reduced to a sufficient degree (step S39→S40). However if at the end of that timer interval the Flow Status is 11b, then this indicates that the congestion condition continues, and so the congestion notification packet transmission control section 2c again supplies a set of packet generating information for generating a group-specific congestion notification packet, to each of the appropriate ports of that switching hub as described above. (step 39→S37).

If it is found in step 34 that the Flow Status is 11b (i.e., Y decision) and also (in step S35) the Timer Status is 1 when a data packet has been received at a port, then this indicates that a group-specific congestion notification packet has already been transmitted and that the retransmission timer is in operation, so that no further operations are performed by the section 2c in response to that condition (step S41). That condition can result from a packet being received in the interval between the time point at which a group-specific congestion notification packet is transmitted and the point at which the packet actually takes effect in producing a transmission halt, i.e., due to residual data packets continuing to be transmitted from one or more data output buffers. Since pause packets have already been sent to the terminals which originated these data packets, no additional congestion notification packet is generated. In that way, the number of congestion notification packets which are generated is minimized, so that the load on the network is reduced.

Figure 12:
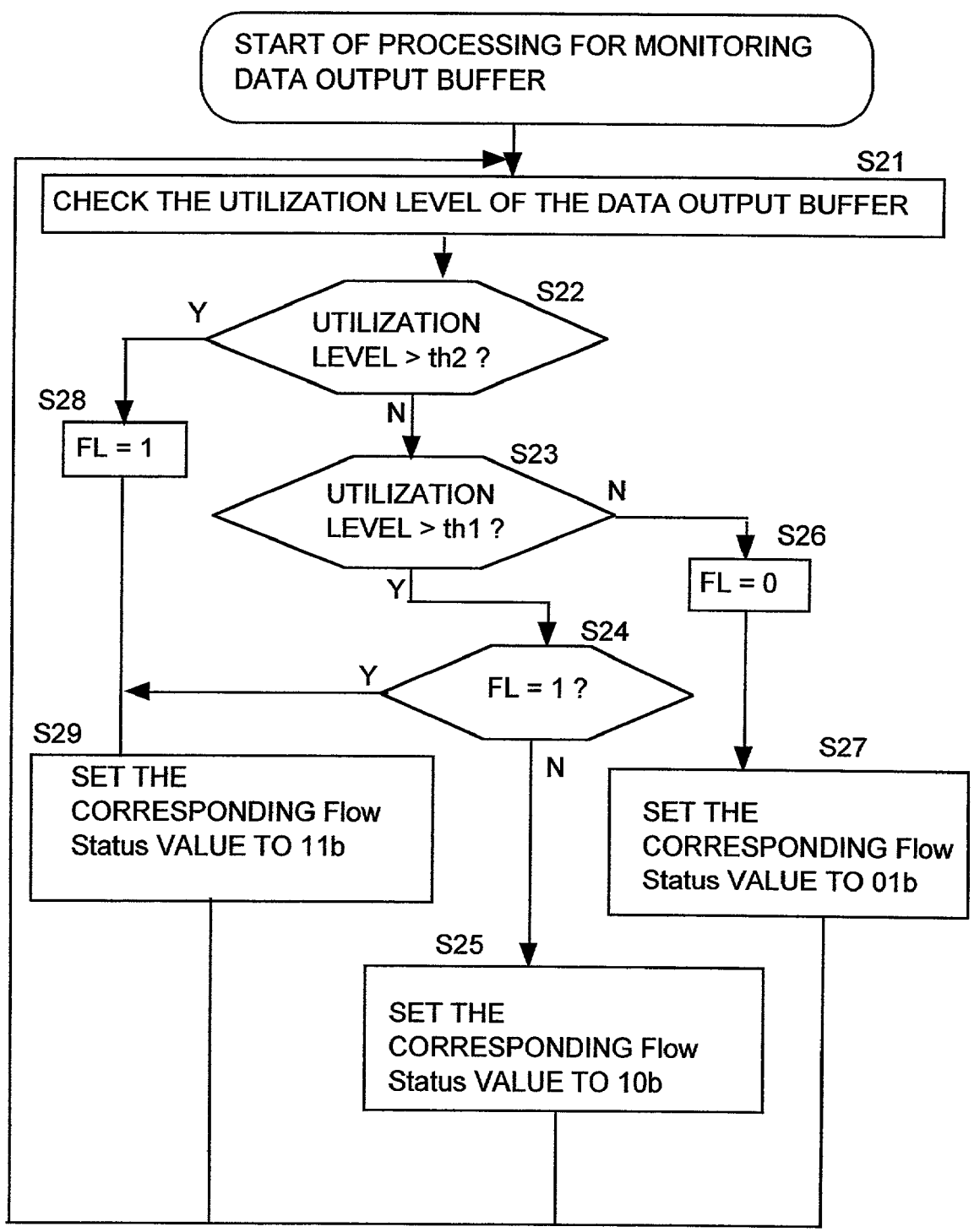
FIG. 12 is a flow diagram of the operation of an output buffer monitoring section of a port of a switching hub of the first embodiment, shown in FIG. 3.

Next, the operation of the output buffer monitoring section 12 of a port of a switching hub SW will be described, referring to FIG. 12. The output buffer monitoring section 12 continuously monitors the respective utilization levels of the data output buffers 11l to 11m corresponding to the respective terminal groups #1 to #m (step S21). When the utilization level of one of the data output buffers 11l to 11m exceeds the first-stage congestion threshold value th1 but not the second-stage threshold value th2 (i.e., due to a congestion origin data packet being written into that data output buffer) then the Flow Status value in the corresponding section of the congestion status table 2b is set to 10b (steps S22 to S25). As a result, an individual congestion notification packet is transmitted from the port in hub SW which received the congestion origin packet. If it is found in step S23 that th1 is not exceeded, then a flag bit FL is set to 0, and the corresponding Flow Status value in the congestion status table 2b is set to 01b.

It is possible that a plurality of terminals may be sending data packets to the switching hub SW to be transmitted out of the port where congestion occurs. This condition has been described above referring to FIG. 1B for port P21 of switching hub SW2. In that case, after an individual congestion notification packet has been transmitted, unchanged transmission of data packets from terminals of the congestion origin group which have not received a pause packet may result in the second-stage congestion threshold value th2 then being exceeded (i.e., Y decision in step S22 of FIG. 12). In that case, the flag FL is set to 1 and the Flow Status value in the corresponding section of the congestion status table 2b (i.e., corresponding to the congestion origin group and the port where congestion is occurring) is set to 11b (steps S22 to S29), thereby indicating that second-stage congestion status has been reached for the data output buffer corresponding to that group.

In that condition, a set of group-specific congestion notification packets are generated as described hereinabove, and transmitted from each of the ports (other than the congestion status port) that is connected to terminals of the congestion origin group.

Hence, transfer of data packets into the congested data output buffer is entirely halted, so that the buffer utilization level can be rapidly reduced.

After packet transfer to the congested one of the data output buffers 11l to 11m of the transfer port has been halted by the flow control operation described above, and the utilization level of that buffer becomes reduced, no change is made in the corresponding Flow Status value in the congestion status table 2b of switching hub SW until the degree of congestion falls below the first-stage threshold value (th1). The decision concerning that is made by the output buffer monitoring section 12 of the congested port, based upon whether or not the value of the flag FL is 1 (in judgement step S24). When the utilization level falls below the threshold value th1 (i.e., N decision in step S23), then the corresponding Flow Status value is set to 01b (step S27) and the flag FL is set to 0 (step S26). Processing then returns to step S21.

As a result of this processing, if the utilization level of the congested one of the data output buffers is not reduced sufficiently by the effect of a single transmission of a set of group-specific congestion notification packets, another such set of group-specific congestion notification packet will again be transmitted. Hence, the congestion status of the ports can be rapidly improved.

Figure 13:
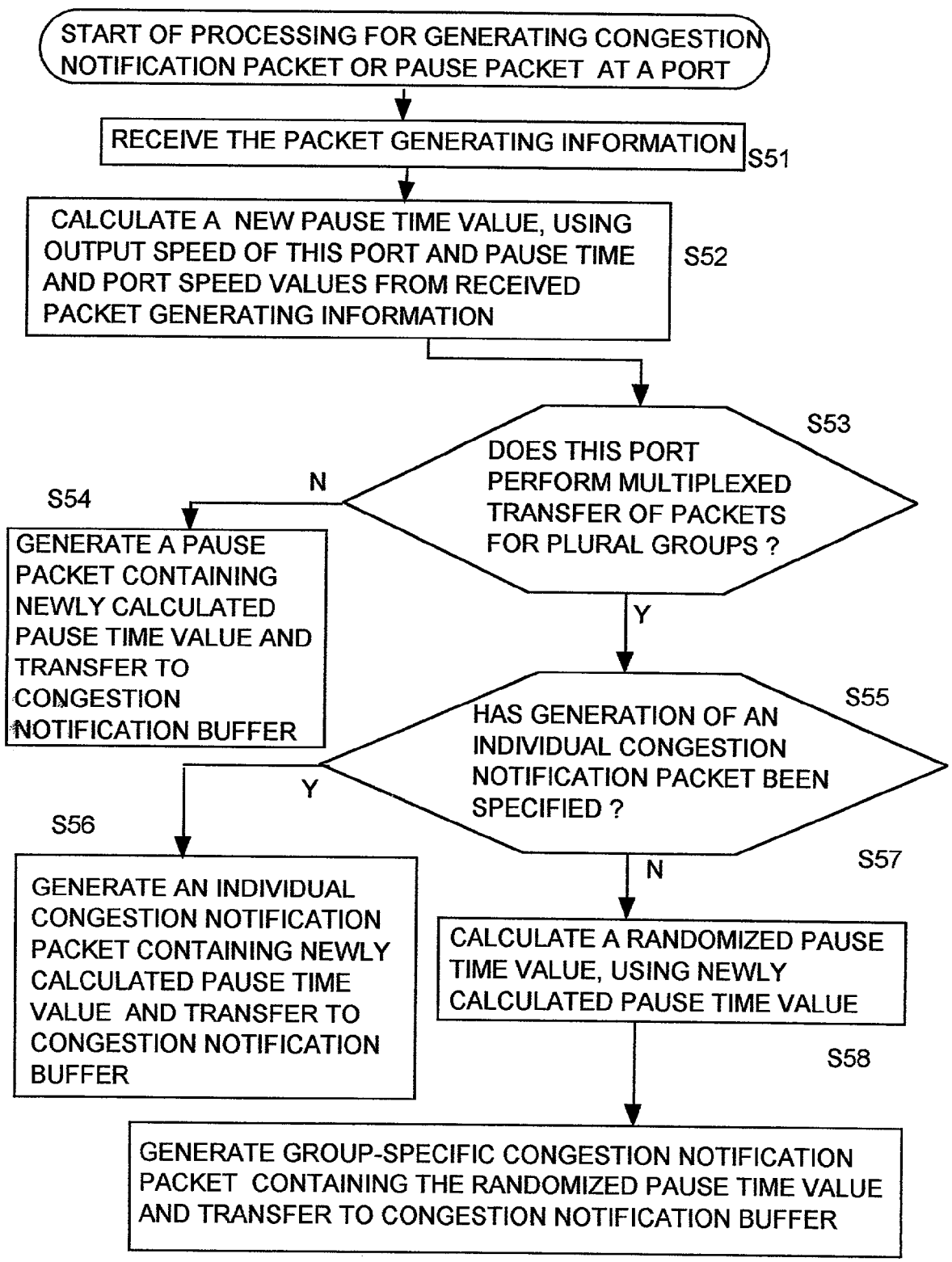
FIG. 13 is a flow diagram of the operation of a congestion notification packet generating section of a port of a switching hub of the first embodiment, shown in FIG. 3.

The operation for generating a congestion notification packet or pause packet by the packet transmission control section 3b of a port will be described referring to FIG. 13. It should be noted that the processing shown in FIG. 13 applies to both the case of internal generation of a congestion notification packet (e.g., at port P23 in response to the congestion condition of port P21 in the example of FIG. 1A), and generation of a congestion notification packet or pause packet in response to a received congestion notification packet (e.g., at port P51 in response to the congestion notification packet received at port P50, in FIG. 1A). It should also be noted that the output data transfer speed of the transfer port, i.e., the congestion notification packet or pause packet generating port, is applied as the value PortOutputSpeed in equation (2) of FIG. 8 described above.

When the congestion notification packet generating section 13 of the packet transmission control section 3b of the transfer port receives the packet generating information from the congestion notification packet transmission control section 2c (S51) then firstly, a new pause time value is calculated from equation (2) of FIG. 8. There are three possible ways in which equation (2) is applied, i.e.:

(a) Internal generation of an individual congestion notification packet. The packet generating information conveys the predetermined pause time value A, for use as PauseTime$_{in}$, and the corresponding reference port speed (e.g., 10 Mbps) for use as PortSpeed$_{in}$ in equation (2).

(b) Internal generation of a group-specific congestion notification packet. The packet generating information conveys the predetermined pause time value B, for use as PauseTime$_{in}$, and the corresponding reference port speed for use as PortSpeed$_{in}$.

(c) Generation of a congestion notification packet or pause packet in response to a received congestion notification packet. The packet generating information conveys the pause time value contained in the received congestion notification packet, for use as PauseTime$_{in}$, and the data input speed of the port which received the congestion notification packet, for use as PortSpeed$_{in}$.

If the port concerned does not handle data packets of a plurality of groups, then a pause packet is generated (step S54) containing the newly calculated pause time value together with the destination address information etc., conveyed by the packet generating information, and transferred to the congestion notification buffer 110.

If the port concerned does handle data packets of a plurality of groups by multiplexing operation (corresponding to a Y decision in step S53) then a decision is made as to whether or not generating of an individual congestion notification packet is specified in the packet generating information. If so (Y decision in step S55), an individual congestion notification packet is generated containing the newly calculated pause time value, and transferred to the congestion notification buffer 110.

However if it is specified that a group-specific congestion notification packet is to be generated, then a newly calculated pause time value (derived from the equation of FIG. 8, using the aforementioned predetermined pause time value B as PauseTime$_{in}$) is used as PauseTime$_x$ in equation (1) of FIG. 7, to obtain a randomized pause time value as described hereinabove (step S57). A group-specific congestion notification packet is then generated containing the randomized pause time value, and transferred to the congestion notification buffer 110.

It can be understood from the above description that with this embodiment, the pause time value which is conveyed to a terminal by a pause packet is determined based on the actual overall speed at which data are transferred between that terminal and a switching hub having a port that is in the congested status. Specifically, a duration (the pause time A or pause time B value) is predetermined, for which transfer of data packets from a terminal to the congested port of a switching hub must be halted, on the assumption that the speed of data transfer from that terminal to the switching hub is some arbitrary nominal value (e.g., 10 Mbps). However the actual pause time value which is inserted in a pause packet that is transmitted to a terminal is modified in accordance with the respective actual data transmission rates of one or more data communication links over which data packets are transmitted to reach the data output buffer which is in the congestion status. It is thereby ensured that the duration for which data transfer into a congested data output buffer of a port is halted can be made independent of variations in the speeds of these various data communication links.

Furthermore as described above, the interval for the retransmission timer (which is set in operation when a set of group-specific congestion notification packet are internally generated to be transmitted from respective ports, as described hereinabove) is made shorter than the minimum possible value of the respective randomized pause time values that are inserted in the congestion notification packets. The aforementioned time interval set for the retransmission timer is determined based on that port-specific pause time value, such as to ensure that the timer interval is no longer than the reference PauseTime$_x$ value. As a result, when group-specific congestion notification packets are transmitted to various terminals of a group, it will be ensured that the interval during which all transmission of packets from that group is halted will be longer than the timer interval. Hence, if the buffer utilization level of the congested data output buffer has not been reduced to a sufficient extent by transmitting a first set of group-specific congestion notification packets, so that another set of group-specific congestion notification packets is again transmitted when the timer interval has ended, it can be ensured that transmission of data packets of the congestion origin group will not begin before the subsequent group-specific congestion notification packets have taken effect. This further serves to ensure that congestion can be rapidly reduced.

Moreover, since the pause time value which is conveyed by a group-specific congestion notification packet has been randomized by applying equation (1) of FIG. 7, it is ensured that there will be variations between the time points at data packets from the respective terminals again start to be transmitted upon completion of their respective pause time intervals. Hence there is a reduced possibility that this will result in the congestion condition immediately recurring, due to data packets from a plurality of terminals of a group beginning to be transferred at the same time into the single data output buffer that is assigned to that group, at the congested port.

Next, referring to FIG. 14, the packet transmission processing which is executed by the packet transmission control section 3b of a port of a switching hub SW will be described. The transmission processing section 14 controls readout from the data buffers 11l~11m (respectively corresponding to specific terminal groups as described above) and the congestion notification buffer 110. When there are data of a congestion notification packet held in the congestion notification buffer 110, then that packet is transmitted with priority (step S62→S61). If there are no data in the congestion notification buffer then read-out control is switched to the data output buffers 11l~11m (step S62→S63). If data are held concurrently in a plurality of data output buffers (i.e., a plurality of data output buffers each corresponding to a specific terminal group each have at least one data packet waiting to be transmitted) then one of these data output buffers is selected for readout and transmission of a data packet therefrom (step S64→S65, S66).

Various methods could be envisaged for implementing such buffer readout control, such as using a round-robin technique, WFQ, etc., and the present invention is not limited to any specific method.

The receiving processing for congestion notification packets and pause packets will be described in the following referring to FIG. 9. When a packet is received at a port, then firstly the packet header is analyzed by the packet receiving control section 3a, and if it is found that a pause packet has been received, the pause time value conveyed by that packet is transferred together with a transmission halt command to the packet transmission control section 3b of the receiving port (step S9). In response, the packet transmission control section 3b halts read-out from all of the output buffers 11l to 11k during a transmission halt interval, whose value is established based on the received pause time value. If on the other hand it is found that the received packet is not a pause packet (i.e., must be either a data packet or a congestion notification packet) then the packet receiving control section 3a sends information to the packet transfer control section 2a which specifies the packet identifier information, destination address, transmission source address, and group identifier (step S3, S4, S5→S7, S8).

The packet transfer control section 2a uses these items of information to look up the group table 1b of the terminal managing section 1, to determine the transfer port for the received packet, and notifies that to the packet receiving control section 3a of the receiving port. On receiving this notification, the packet receiving control section 3a judges the type of the packet (step S5) and if it is a congestion notification packet, the packet receiving control section 3a extracts packet generating information from the received packet and transfers the information to the congestion notification packet generating section 13 of the transfer port for the packet (step S7), then the received packet is discarded (step S8). In that way, the transfer processing for a received congestion notification packet within a switching hub is performed by a similar sequence of operations to those for a data packet.

The operation of the packet transfer control section 2a in this case will be described referring again to FIG. 10. When the packet transfer control section 2a receives the packet identifier information and the header information for a received congestion notification packet from the packet receiving control section 3a of the receiving port (step S11) then in the same way as for a usual type of data packet, the transfer destination address of the packet is examined. However in this case, the information obtained is used to determine whether the packet is an individual congestion notification packet or a group-specific congestion notification packet, i.e., is a unicast packet or a broadcast packet (step S12).

If the packet is an individual congestion notification packet, the transfer port is determined based on the transfer destination address contained in the packet (step S13), and the packet receiving control section 3a of the receiving port is then notified of that transfer port (step S16). The operation at that stage differs from that for a data packet in that the header information etc. are not notified to the congestion notification packet transmission control section 2c. If the packet is found to be a multicast packet, then a transfer port list is generated, based on the group identifier that is contained in the packet (step S17), and the packet receiving control section 3a of the receiving port is notified of the contents of this list (step S16). The operation in the case of a group-specific congestion notification packet at this stage differs from that for a multicast data packet in that, with the congestion notification packet, all of the ports (of that switching hub) which are connected to terminals of the specified group are listed as transfer destinations for the packet, irrespective of the respective congestion statuses of these ports.

The designation "receiving port" in FIG. 10 signifies the port which received the data packet or congestion notification packet that is to be processed. The designation "transfer port(s)" signifies:

(a) (in the case of processing a received data packet within a switching hub), one or more ports to which the received data packet is to be transferred for transmission, (b) (in the case of processing a received individual congestion notification packet), a port at which an individual congestion notification packet (based on the received packet) is to be generated and transmitted, or (c) (in the case of processing a received group-specific congestion notification packet), a set of ports at each of which a group-specific congestion notification packet (based on the received packet) is to be generated and transmitted.

It can thus be understood from the above that received congestion notification packets are transferred and processed in a similar way to the usual types of data packet, both in the case of individual congestion notification packets and group-specific congestion notification packets. Hence, special protocol processing is not required, so that flow control can be applied efficiently to the individual groups.

The above embodiment has been described for the case in which the data output buffers of the output buffer section 11 are managed respectively separately, and correspond to respective terminal groups. However it would be equally possible to perform this management processing on the basis of the respective addresses of the individual terminals. Furthermore with the above embodiment, the utilization levels of the data output buffers of the output buffer section 11 are judged respectively separately in the congestion management process, however it would be equally possible to perform such management by queuing the outputs from the respective groups, in the case in which physical buffers are managed in units of fixed-length blocks.

As can be understood from the above description, the first embodiment has the following advantages. Control packets (congestion notification packets) are transmitted to effect limitation of transmission of data packets from only those devices for which communication is to be restricted, when congestion occurs at a port of a switching hub. A switching control network can thereby be realized in which packet loss does not occur and halting of transmission of data packets through the network is minimized, even when a large number of terminals are connected to the network and these are managed as a plurality of respectively separate terminal groups.

In the above description, the case has not been specifically described in which congestion occurs at a group-multiplexing port of a front-end hub, such as port P50 of switching hub SW5 in the example of Figs. 1A, 1B. In such a case, if for example first-stage congestion is detected for the data output buffer in port P50 that is assigned to terminal group #1, and terminal G of group #1 is determined as the congestion origin, then a pause packet would be internally generated in switching hub SW5 and transmitted from port P51 to the terminal G. If second-stage congestion were to be detected for that data output buffer, then pause packets would be respectively transmitted to each of terminals G, H from ports P51, P52.

With the simple two-layer network of switching hubs shown in Figs. 1A, 1B it is unlikely that such congestion could occur. However it should be understood the invention is not limited to such a configuration, i.e., in which each of the front-end hub ports which handles data packets for a only a single terminal group is connected directly to respective terminals, rather than to a lower-layer hub.

Second Embodiment

A second embodiment of the invention will be described referring to FIGS. 15 to 25. In the same way as for the preceding embodiments, the description applies to a port which handles data from a plurality of groups, unless otherwise indicated. The features of this second embodiment can be summarized as follows:

(a) Each port is provided with a single data output buffer, used in common by all terminal groups for which data packets can transmitted from the port (these being referred to in the following as "groups connected to the port").

(b) A threshold value of total data flow rate into the data output buffer is predetermined. Each time a received data packet is transferred to the buffer, a decision is made as to whether that threshold value has been exceeded. If so, that threshold value is divided by the total number of groups which are currently using the buffer, to obtain a flow rate threshold value that is allocated to each of these groups.

(c) If the allocated threshold value of flow rate is found to be exceeded for the terminal group corresponding to the received packet, signifying a first-stage congestion status of the data output buffer with respect to that group, an individual congestion notification packet is transmitted to the terminal which originated that data packet.

With the first-stage congestion control which is thereby applied with this embodiment, control is applied respectively separately to each of the terminal groups that are connected to the port. Furthermore, since the allocated flow rate threshold value for a terminal group is made inversely proportional to the total number of terminal groups which are actually utilizing the port to transmit data at that time, maximum efficiency of buffer utilization can be achieved.

In addition, the utilization level of the data output buffer is continuously monitored. If that utilization level exceeds a predetermined threshold value, signifying that a second-stage congestion status has occurred, then group-specific congestion notification packets are transmitted to each of the terminal groups which are connected to the port (i.e., to all of the terminals which might possible transmit data packets that would be transferred to the data output buffer of that port).

By applying two-stage control in that way, packet loss can be prevented, while the effects of the congestion control are limited as far as possible to a terminal group causing the congestion.

Figure 15:
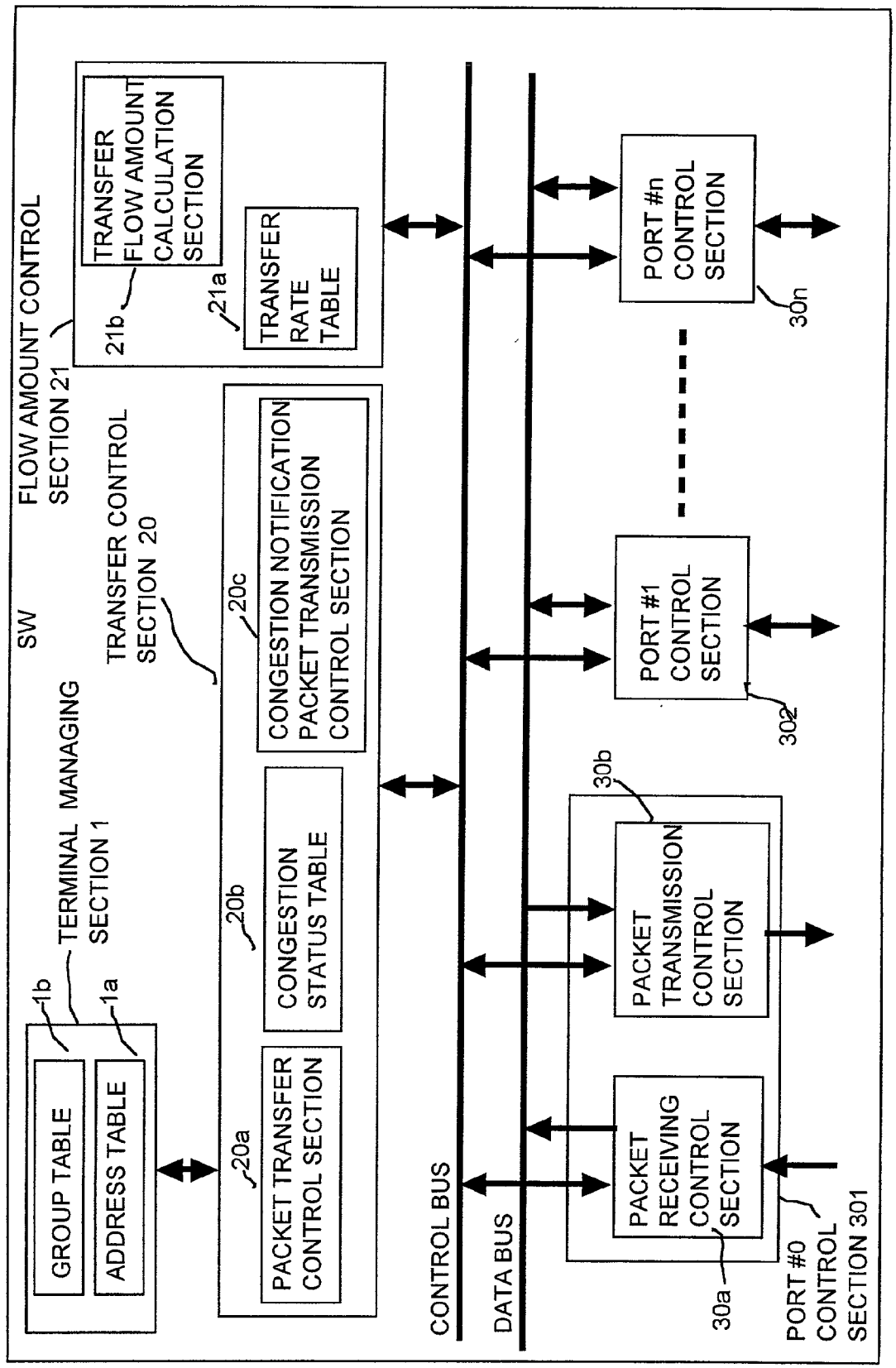
FIG. 15 is a general block diagram showing details of a switching hub of a second embodiment of a flow control apparatus.
Figure 16:
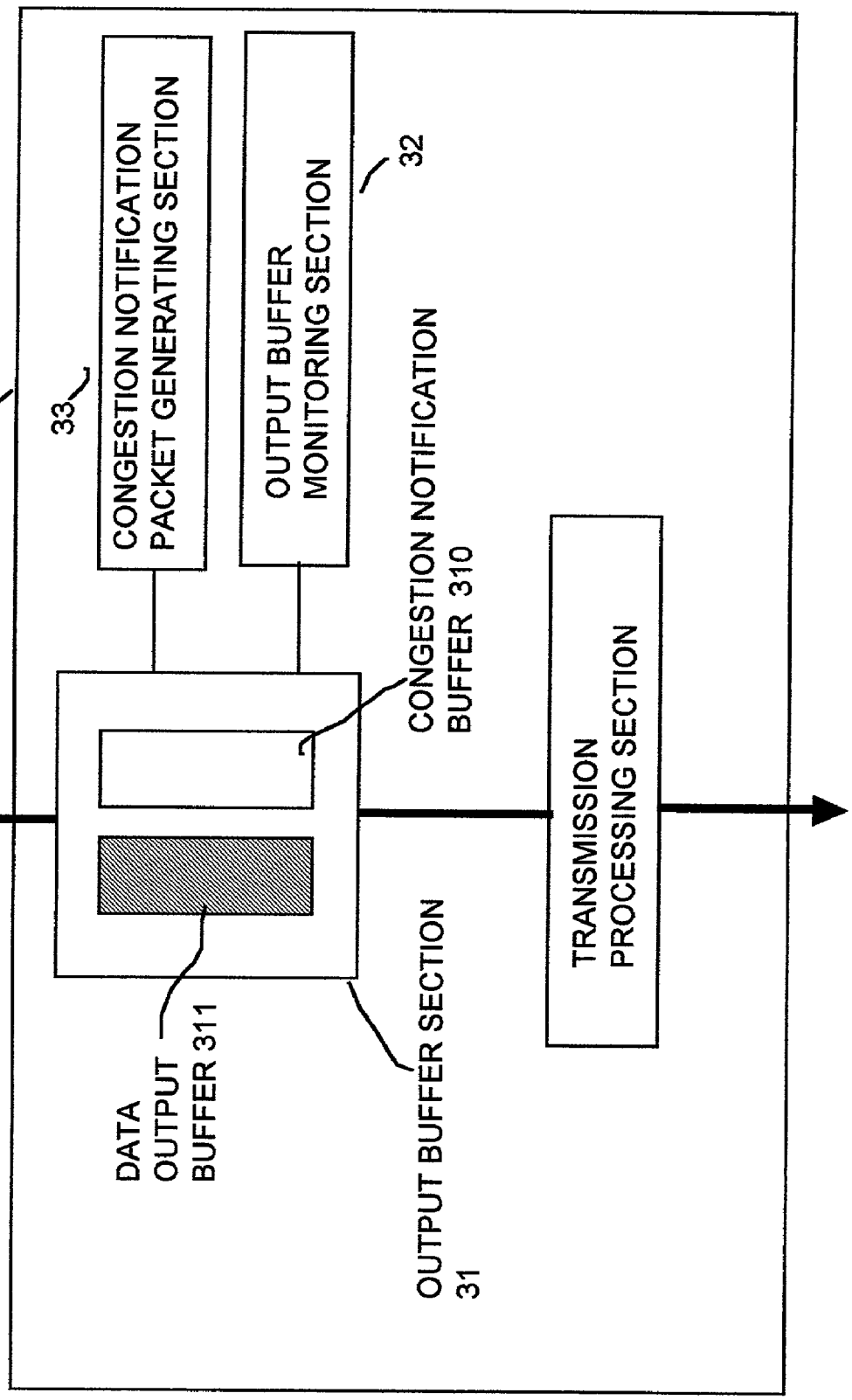
FIG. 16 is a block diagram of a packet transmission control section of a port of a switching hub of the second embodiment.

With the second embodiment, as shown in FIG. 15, a switching hub contains a flow amount control section 21 formed of a transfer rate table 21a which registers (respectively separately for each of the ports) the respective flow rates of data transferred to the packet transmission control section by each group, and a transfer flow amount calculation section 21b which calculates these individual flow rates. The switching hub further includes a terminal managing section 1 as for the first embodiment, and a transfer control section 20, while each of the ports #0 to #n has a packet receiving control section 30a and a packet transmission control section 30b. The transfer control section 20 of the second embodiment is formed of a packet transfer control section 20a, a congestion status table 20b, and a congestion notification packet transmission control section 20c.

With a port of a switching hub of the first embodiment, congestion statuses are measured separately for each of respective data output buffers that are assigned to individual terminal groups. However with the second embodiment this judgement is performed by the flow amount control section 21. Specifically, the packet transmission control section 30b of each of the output ports, having the internal configuration shown in FIG. 16, includes an output buffer section 31 containing a data output buffer 311 and a congestion notification buffer 310, with the data output buffer 311 performing in common the functions of the plurality of data output buffers (11l~11m) of a port of the first embodiment.

In the following description of the overall operation of this embodiment, only the points of difference between this embodiment and the first embodiment, relating to congestion control, will be described. Other aspects of the operation of the second embodiment are similar to those of the first embodiment. Referring to the example of FIG. 17A, in which each of the switching hubs SW2 to SW5 is configured in accordance with the second embodiment, it is assumed that data packets are being transmitted to the terminal A from the terminal D and the terminal G, i.e., with all of these terminals being within group #1. It is further assumed that the aforementioned first-stage congestion status is reached for port P21 of the backbone hub SW2, due to the aforementioned allocated flow rate threshold value having been exceeded for the terminal group #1, as a result of a data packet from terminal G being transferred to the data output buffer 311 of port P21, i.e., the terminal G is assigned as the cause of congestion at port P21. As a result, an individual congestion notification packet is generated at port P23 (which is the receiving port for the congestion origin data packet) and transmitted therefrom, addressed to the terminal G. The subsequent operation is as described for the first embodiment.

It can thus be understood that with such a method, transmission of packets is halted only for a terminal which is determined as being a cause of the first-stage congestion condition. In that way, a single data output buffer implements the functions of the plurality of data output buffers of a port of the first embodiment.

Figure 17A:
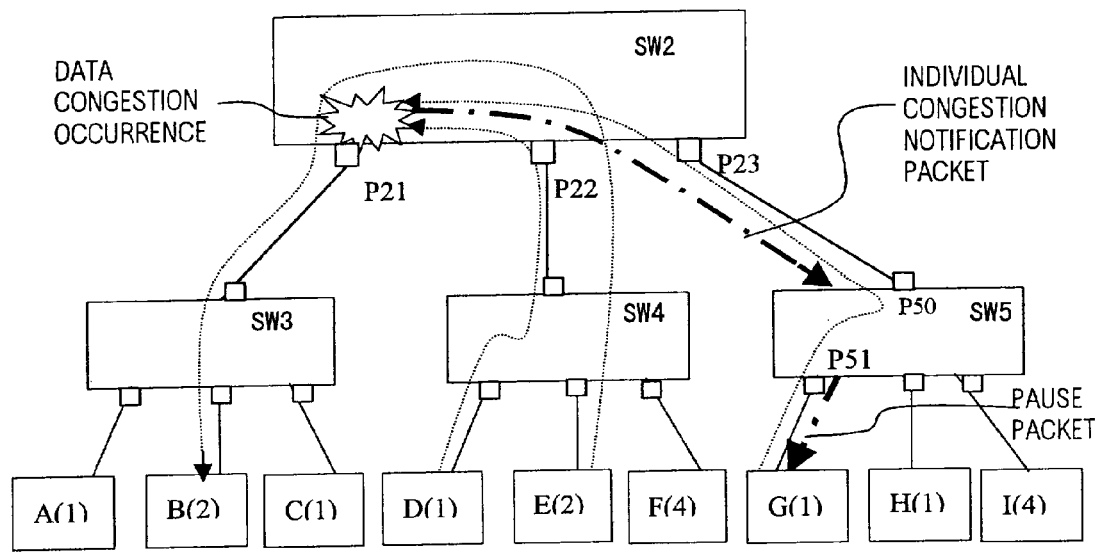
FIG. 17A is a conceptual system diagram for describing the operation of the second embodiment, for the case of an individual congestion notification packet being generated.

Furthermore when a data transmission halt is established for a specific terminal (in the above example, a group #1 terminal) this has no effect upon transmission of data for other terminal groups, such as group #2 in the example of FIG. 17A. So long as the data transmission rate of packets between group #2 terminals through any port does not exceed the aforementioned allocated data rate threshold value, packet transfer for group #2 terminals will continue to be enabled.

As occurs with the first embodiment, group-specific congestion notification packets are generated and transmitted from a switching hub when a certain congestion level is reached. However with the second embodiment, the utilization level of the data output buffer of a port is continuously monitored and when a predetermined threshold value of utilization level is exceeded, this signifies that the second-stage congestion condition has been reached. In that case, group-specific congestion notification packets are transmitted to all of the terminal groups that are connected to the packet transmission control section 30b of that port, and so might originate data packets that would be transmitted from that packet transmission control section.

Figure 17B:
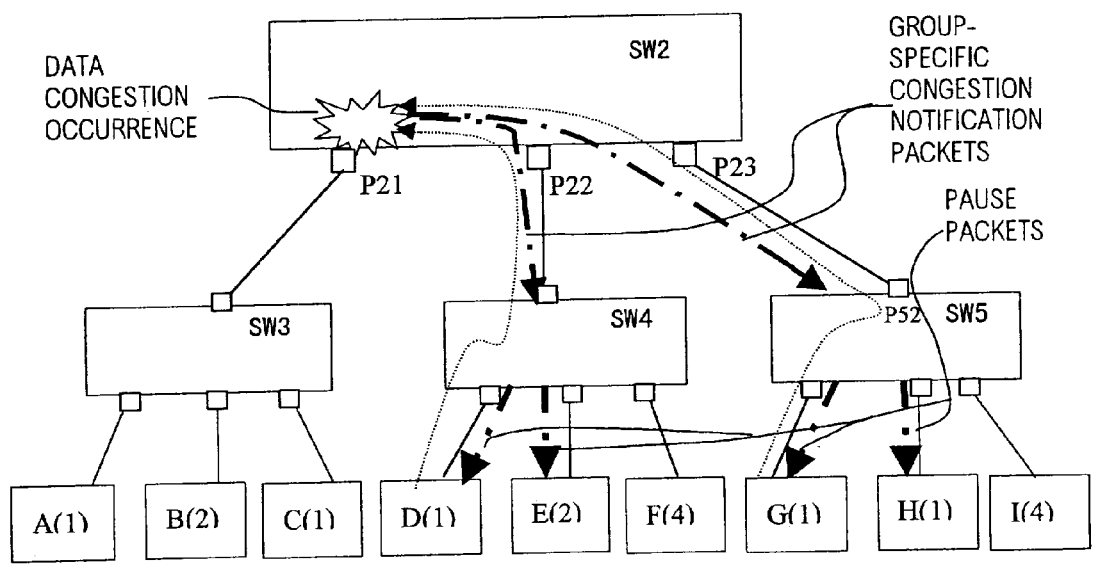
FIG. 17B is a conceptual system diagram for describing the operation of the second embodiment, for the case of a plurality of group-specific congestion notification packets being generated.

More specifically, referring to the example of FIG. 17B, it is assumed that the flow rate of data entering the output buffer 311 of the port P21 of hub SW2, originating from the group #1 terminals D and G, is so high that the threshold value of utilization level of that port has been exceeded. As a result, switching hub SW2 transmits group-specific congestion notification packets directed to each of the terminal groups having at least one terminal thereof connected to the packet transmission control section 30b of port P21 (so that data packets for that group are being transferred to be transmitted from port P21, or may begin to be transferred to that port). In this example, these are the terminal groups #1 and #2. Hence, group-specific congestion notification packets directed to group #1 are respectively transmitted from ports P22, P23 and a group-specific congestion notification packet directed to group #2 is transmitted from port P22.

By using such a method, when congestion occurs at a port due to data packets transmitted from a plurality of terminals, it is ensured that no further packets will be transmitted from any terminal, to be transferred to the data output buffer 311 of the congested port, until the congestion condition has been relieved. Hence, packet loss can be reliably prevented.

In such a case, communication can continue to occur between terminals of any group which is not connected to the port that is in the congestion status, i.e., any group which will not originate data packets that will be transmitted from that port. In the example of FIG. 17B, this is true for the terminal group #4, with respect to the port P21.

With the second embodiment, a transfer rate table 21a shown in FIG. 18 and a transfer flow amount calculation section 21b (which calculates the rate values appearing in the transfer rate table 21a) are used to judge the congestion statuses separately for each of the groups #0 to #m. For each of the ports of a switching hub, Rate Count values respectively corresponding to the terminal groups each having one or more terminals that are connected to the packet transmission control section of that port (these being referred to in the following simply as terminal groups that are connected to the port in question) appear in the transfer rate table 21a. Each Rate Count value is a number of bytes constituting packets which are transferred to the data output buffer 311 of that port during a unit time interval.

In addition, for each of the ports, Time Stamp values respectively corresponding to the terminal groups which are connected to that port appear in the transfer rate table 21a, as shown in FIG. 18. The Time Stamp value corresponding to a specific terminal group, in relation to a specific port, indicates the time point at which a data packet for that terminal group was last transferred to the data output buffer 311 of that port.

Furthermore, Total Rate values respectively corresponding to the various ports of the switching hub appear in the transfer rate table 21a. The Total Rate value corresponding to a port is the total of the respective Rate Count values for the various terminal groups whose data are transferred through the data output buffer 311 of that port.

FIG. 19 shows an example of the congestion status table 20b of a switching hub of the second embodiment. As shown in FIG. 19 the congestion status table 20b has, for each of the ports P0 to Pn of that switching hub, separate Rate Status entries corresponding to each of the terminal groups #0 to #m. Each Rate Status value expresses the congestion status for the port with respect to the corresponding group, measured based on the rate at which data of a terminal of that group are transferred into the data output buffer 311 of that port. In addition, respective Buffer Status entries corresponding to the ports PO to Pn are provided. Each Buffer Status value expresses the congestion status of the corresponding port, i.e., congestion resulting from an excessive level of utilization level of the data output buffer 311 of that port.

Rate Status can take three values, i.e.,:

00b which indicates that no terminal of the group concerned is connected to that port;

01b which indicates that the allocated threshold value of data rate is not exceeded; and 10b which indicates that the allocated data rate has been exceeded as a result of data sent to that port from a specific terminal, and hence indicating that an individual congestion notification packet is to be generated, addressed to that terminal.

The Buffer Status of a port can take two values, either 0 which indicates that a predetermined threshold value of utilization level the data output buffer 311 is not exceeded, or 1 which indicates that the utilization level threshold value is exceeded, so that group-specific congestion notification packets are to be generated.

Figure 20:
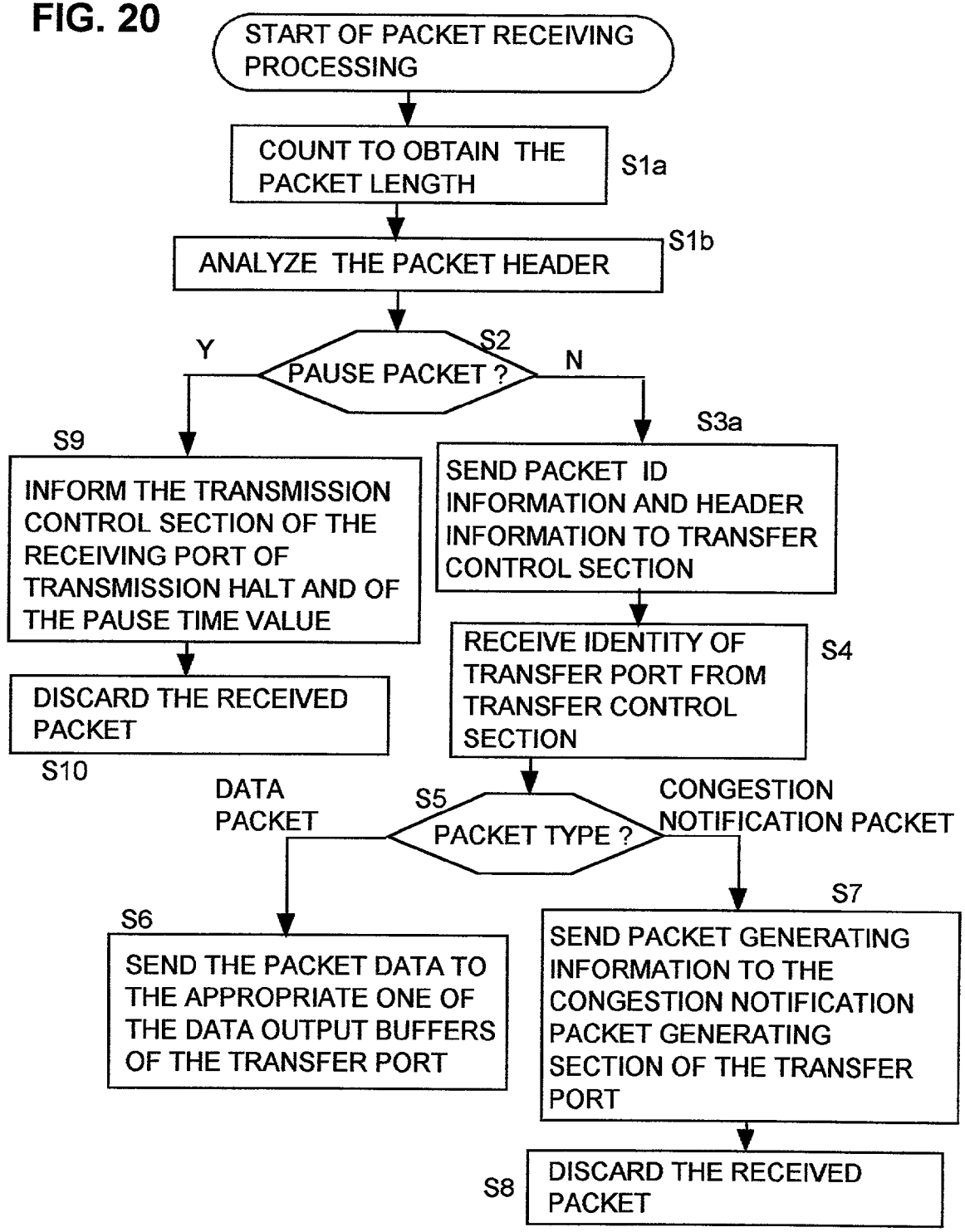
FIG. 20 is a flow diagram of the operation of a packet receiving control section of a port of a switching hub of the second embodiment.

Next, the operation during packet receiving operation will be described referring to FIG. 20. When a packet is received in the packet receiving control section 30a of a port, the number of bytes constituting the packet length is counted (step S1a). Next, the packet header is decoded (step S1b) and if the packet is found to be a pause packet then the same processing is executed as for the first embodiment, i.e., transmission of data packets from that port is halted for a specific interval (step S9, S10). If the packet is found to be a data packet or a congestion notification packet, then the packet identification information and header information are sent together with the packet length information to the transfer control section 20 (step S3a). The subsequent processing operations by the packet receiving control section 30a (steps S4 to S8) are identical to those for the packet receiving control section 3a of a port of the first embodiment, as described hereinabove referring to FIG. 9.

Figure 21:
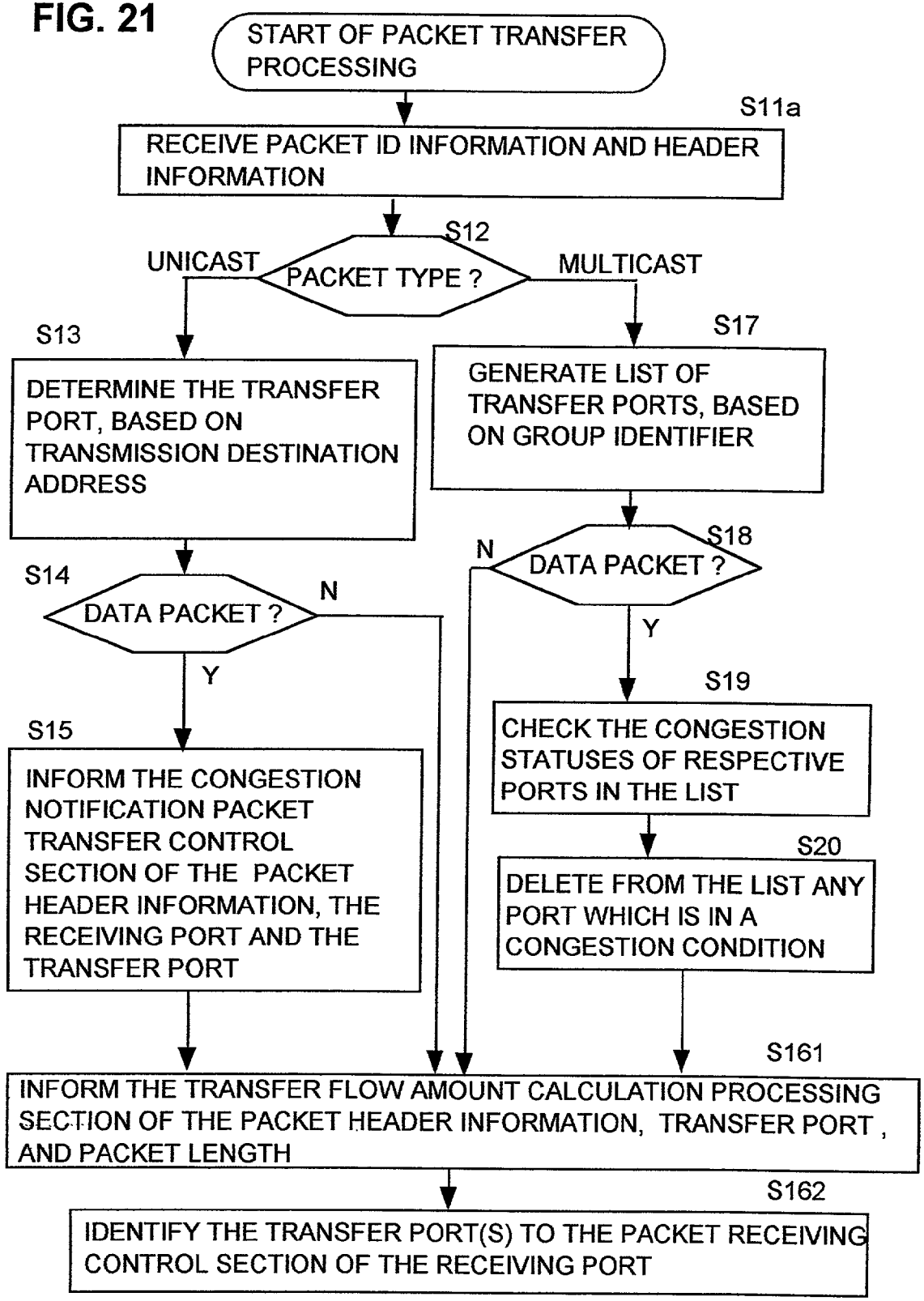
FIG. 21 is a flow diagram of the operation of a transfer control section of a port of a switching hub of the second embodiment.

Packet transfer processing within a switching hub will be described referring to FIG. 21. When the transfer control section 20 receives the packet identification information, header information and packet length information of a received packet, the same steps S11a, S12 to S15, S17 to S20 are performed to obtain the transfer destination as for the first embodiment, described hereinabove referring to FIG. 10. However with the second embodiment, after steps S15 or S20, or after a N decision in step S14 or step S18 (signifying that one or more congestion notification packets are to be generated at respective transfer ports) the transfer port(s) and the packet header information and packet length are notified to the transfer flow amount calculation section 21b (step S161). The transfer flow amount calculation section 21b is also notified at this time as to whether the packet is a multicast packet or a broadcast packet. The transfer port or list of transfer ports is then notified to the packet receiving control section 30a of the port which received the packet (step S162).

In the case of a data packet having been received, the received packet is then transferred from the receiving port to the data output buffer of each of the specified transfer port(s). In the case of a congestion notification packet having been received, packet generating information (as for the first embodiment) is supplied to each congestion notification packet generating section 33 of the specified transfer port(s).

Figure 22:
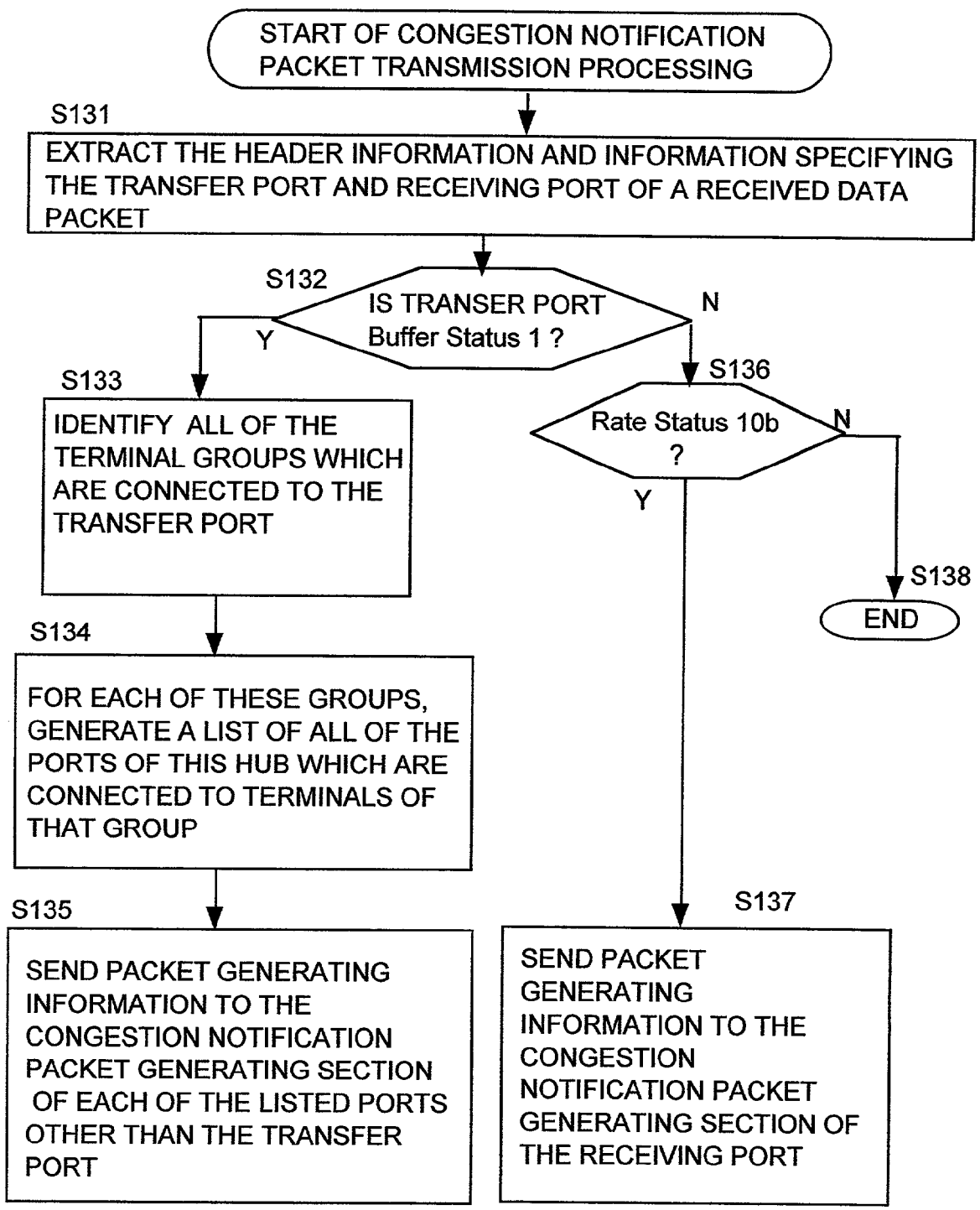
FIG. 22 is a flow diagram of the operation of a congestion notification packet transmission control section of a switching hub of the second embodiment, shown in FIG. 15.

The processing performed in a switching hub of this embodiment to generate and transmit a congestion notification packet will be described referring to FIG. 22. When the packet header information, the transmission source and the transfer port information are extracted from a data packet which is received at a port of a switching hub SW (step S131), then if the value Buffer Status corresponding to any of the transfer ports is 1 (i.e., Y decision in step 132), all of the groups that are connected to that transfer port, i.e., which may possibly send data packets to be transmitted out of that port, are identified (step S133). For each of these groups, a list is generated of all of the ports of the switching hub which are connected to a terminal of that group, such as the ports P22, P23 that are connected to group #1 terminals in the example of FIG. 17B (step S134).

Packet generating information for producing a group-specific congestion notification packet is then supplied to the congestion notification packet generating section 33 of each of the ports thus determined (other than the port which is in the congestion status)(step S135).

However if Buffer Status for all of the transfer ports of the received packet is 0 (i.e., a N decision in step 132) but (for any of these transfer ports) while the corresponding Rate Status for the terminal group corresponding to the received packet is 10b (i.e., a Y decision in step 136) so that an individual congestion notification packet is to be transmitted, then packet generating information for producing an individual congestion notification packet is transferred to the congestion notification packet generating section 33 of the receiving port (step S137).

If Buffer Status is found to be 0 and Rate Status 01b for all of the transfer ports of the received data packet, then no further operation is performed (step S138).

Figure 23:
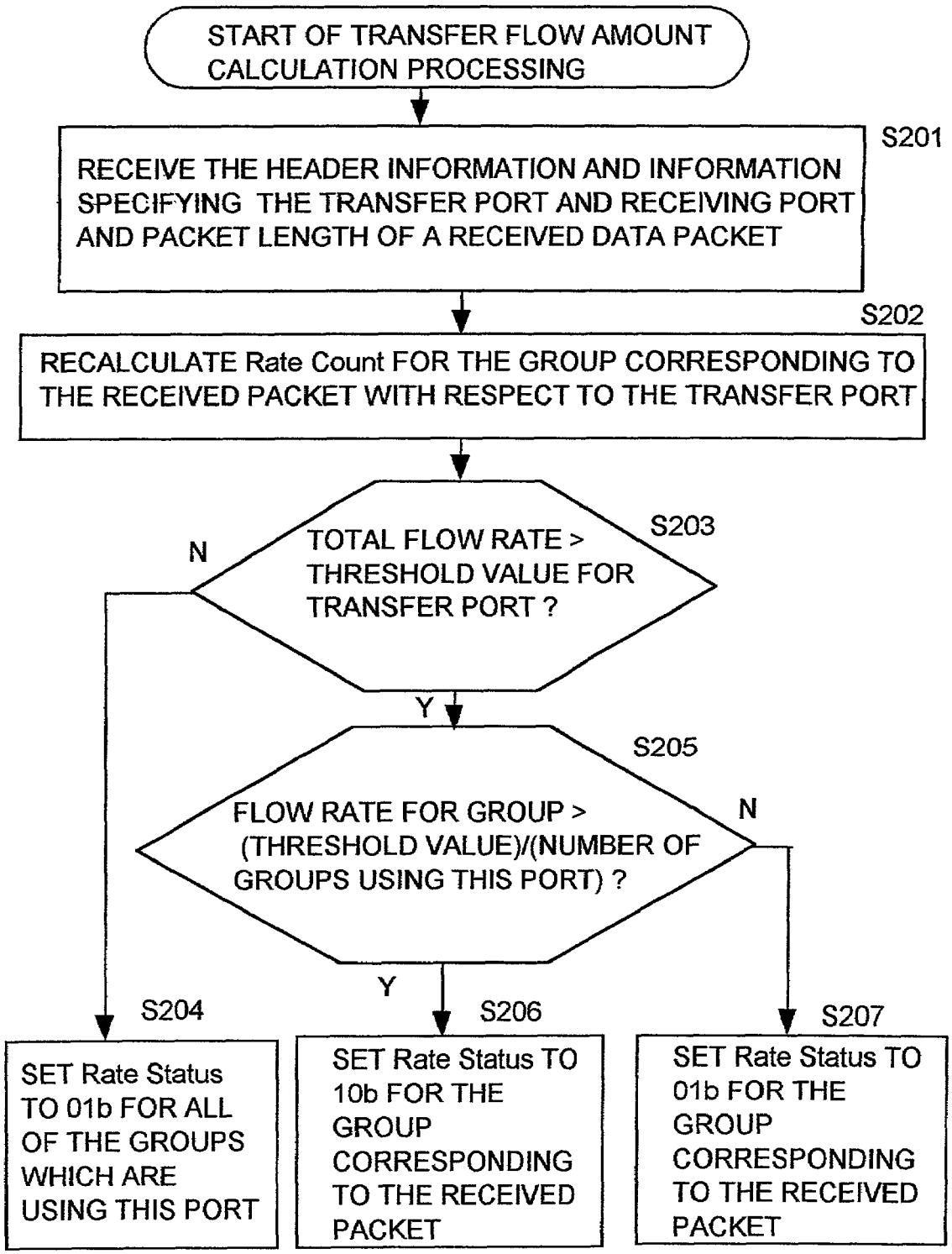
FIG. 23 is a flow diagram of the operation of a transfer flow amount calculation section of a switching hub of the second embodiment, shown in FIG. 15.

Next the operations for calculating data flow rates for packet transfer processing in a switching hub will be described referring to FIG. 23. When a data packet is received at the switching hub, the transfer control section 20 obtains the packet header contents, information expressing the receiving port and the transfer port for this packet, and the packet length (step S201). The transfer control section 20 then calculates an updated Rate Count value for the terminal group corresponding to the received packet, in relation to the transfer port, and also updates the value Total Rate corresponding to that port, based on the total of the Rate Count values (step S202). The updated Rate Count value is calculated by dividing the length of the newly received packet by the time duration which has elapsed from the point that has been registered as Time Stamp for that group until the point of arrival of the newly received packet, with the result being expressed for example as a number of kilobytes with respect to a specific unit time interval.

Each time a newly received data packet is transferred to the data output buffer 311 of a port, the previously registered Time Stamp value for the terminal group containing the terminal which originated that packet (in the section of the transfer rate table 21a corresponding to that port) is overwritten by the time of arrival of the newly received packet.

If it is found that the Total Rate value does not exceed the predetermined threshold value of total flow (an N decision in step S203) then Rate Status is set as 01b for all of the groups which are connected to that port (step S204). The threshold value of total flow rate for a port is calculated based on the maximum number of bytes which can be outputted from the port within a unit time interval. For example if that unit time interval is 100 ms, and the port output speed is 10 Mbps, then a suitable value for the flow rate threshold value for that port could be approximately 122 kilobytes.

If it is found that the total flow rate exceeds the predetermined threshold value (i.e., Y decision in step 203) then an updated value of threshold value of flow rate which is to be allocated to each group is calculated, as follows. First, the number of terminal groups which have used that port to transmit data packets within a predetermined unit time interval, extending up to the current time point, is derived. The threshold value of total flow rate is then divided by that number of groups, and the result is assigned as an updated threshold value of flow rate that is allocated to each terminal group. The updated value of Rate Count for the group corresponding to the newly received data packet is then compared with that allocated threshold value of flow rate, and if the threshold value is found to be exceeded (i.e., Y decision in step 205) then it is judged that congestion has occurred for that group, and the corresponding Rate Status is set to 10b (step S206).

If however the value of Rate Count does not exceed the updated allocated flow rate for that group (i.e., N decision in step 205) then Rate Status for that group is set as 01b (step S207).

Figure 24:
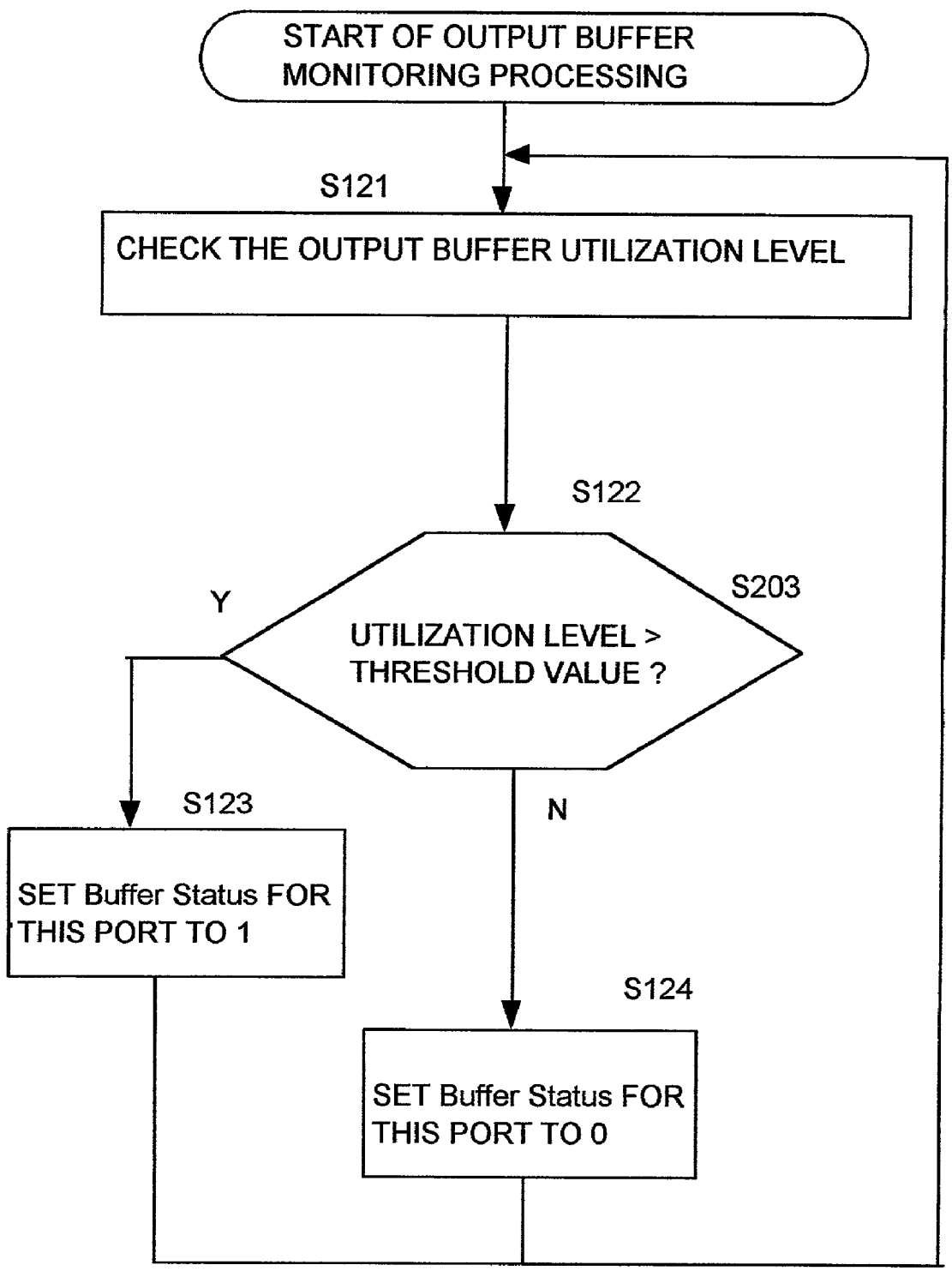
FIG. 24 is a flow diagram of the operation of an output buffer monitoring section of a port of a switching hub of the second embodiment, shown in FIG. 16.

The flow rate monitoring processing which is executed for the data output buffer 311 of a port of a switching hub will be described referring to FIG. 24. With the second embodiment as described above, this data output buffer is used in common for all groups which transmit data out of the port, and the occurrence of congestion is judged primarily based on rates of data flow into the buffer. However in addition, the utilization level of the data output buffer 311 is monitored, so that an increased level of flow control can be applied to prevent packet loss from buffer overflow, if necessary. This monitoring is performed only with respect to a single threshold value, i.e. a predetermined threshold value of utilization level th1 (step S121). If the utilization level of the data output buffer 311 exceeds that threshold value th1 (i.e., Y decision in step S122) then the Buffer Status value for the port is changed to 1 (step S123). This indicates that operation of the port has reached a condition whereby group-specific congestion notification packets are to be transmitted to each of the terminal groups that are connected to the port, to halt further transfer of data into the data output buffer 311 during a specific pause time interval.

The operation of this second embodiment differs from that of the first embodiment with respect to congestion control performed by issuing group-specific congestion notification packets, as follows. With the second embodiment, congestion control performed when the value of Buffer Status for a port is found to be 1 (i.e., when a Y decision has been reached in step S122 of FIG. 24 for that port) is applied by transmitting group-specific congestion notification packets to each of the groups which may possibly originate data packets that will be transmitted from that port. In that way it can be definitely ensured that that flow of data into the data output buffer 311 of the port will be reduced before buffer overflow occurs. If the utilization level of the data output buffer 311 is below the threshold value th1 (i.e., N decision in step 122) then Buffer Status of that port is changed to 0 (step S124).

Figure 25:
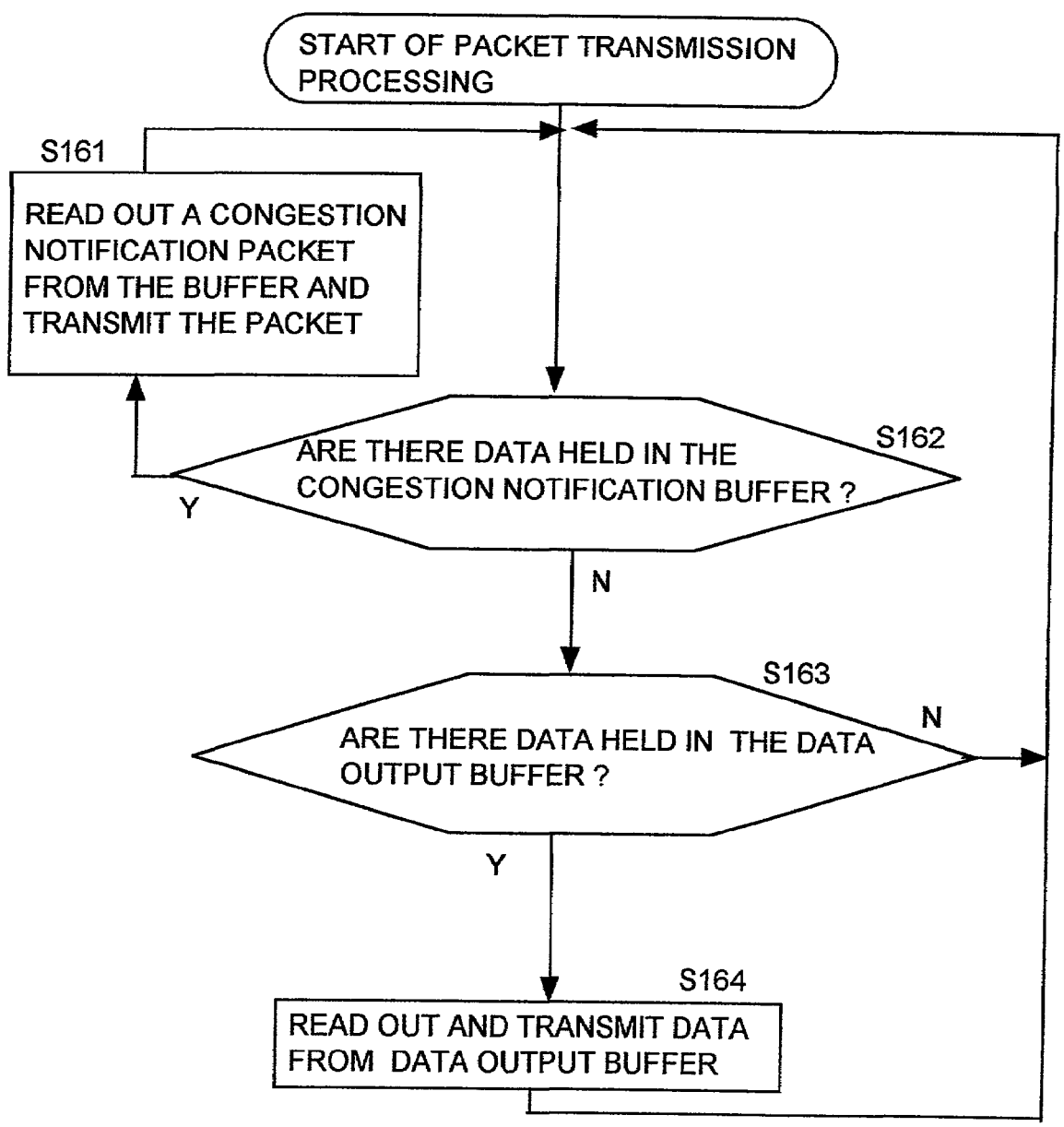
FIG. 25 is a flow diagram of the operation of the packet transmission control section of a port of a switching hub of the second embodiment, shown in FIG. 16.

Finally, the packet transmission processing will be described referring to FIG. 25. With this embodiment, only readout control of the congestion notification buffer 310 and the data buffer 311 of a port is performed, with data readout from the data output buffer 311 being performed (step S164) only if it is found that there are no data held in the congestion notification buffer 310 (i.e., N decision in step 162). Since the data output buffer 311 is used in common by the groups #0 to #m it is not necessary to apply the processing steps S64, S65 of FIG. 14 of the first embodiment. Hence, data output buffer readout processing is simplified.

Since the congestion notification packet generating processing is identical to that of the first embodiment (shown in FIG. 13), further description of that processing is omitted.

As can be understood from the above, with the second embodiment it is not necessary for the packet transmission control section 30b of a port to manage a plurality of buffers corresponding to respective terminal groups, while in addition the readout control operation is simplified. Furthermore since it is not necessary to provide separate data output buffers for each of the groups #0 to #m, the total amount of buffer capacity that is required can be reduced. Moreover with the second embodiment, the flow control processing performs real-time allocation of maximum permissible data transfer rates to the respective terminal groups (i.e., the aforementioned allocated flow rate threshold value) based upon the number of terminal groups which are currently utilizing the port to transmit data packets. The highest possible flow rates can thereby be maintained under various levels of utilization of the data output buffer 311 by the various terminal groups that are connected to the port, and a wide range of flow control can be achieved.

Third Embodiment

A third embodiment will be described in the following, referring to FIGS. 26A to 32. The features of this embodiment can be summarized as follows:

(a) In each switching hub, congestion judgement for a port is performed separately various terminal groups, and a congestion notification packet is sent only to a group for which congestion is judged to have occurred.

(b) The congestion judgement is applied separately to respective ones of a plurality of buffers which are provided respectively assigned to the various terminal groups.

(c) Congestion status is judged in two stages, and flow control can be applied to individual ports or to pluralities of ports.

(d) When a congestion notification packet is received at a port of a switching hub, then congestion control is applied by halting readout from the data output buffer (of that receiving port) which corresponds to the terminal group specified in the congestion notification packet, and no congestion notification packet or pause packet is transmitted from that hub in direct response to the received packet.

Figure 26A:
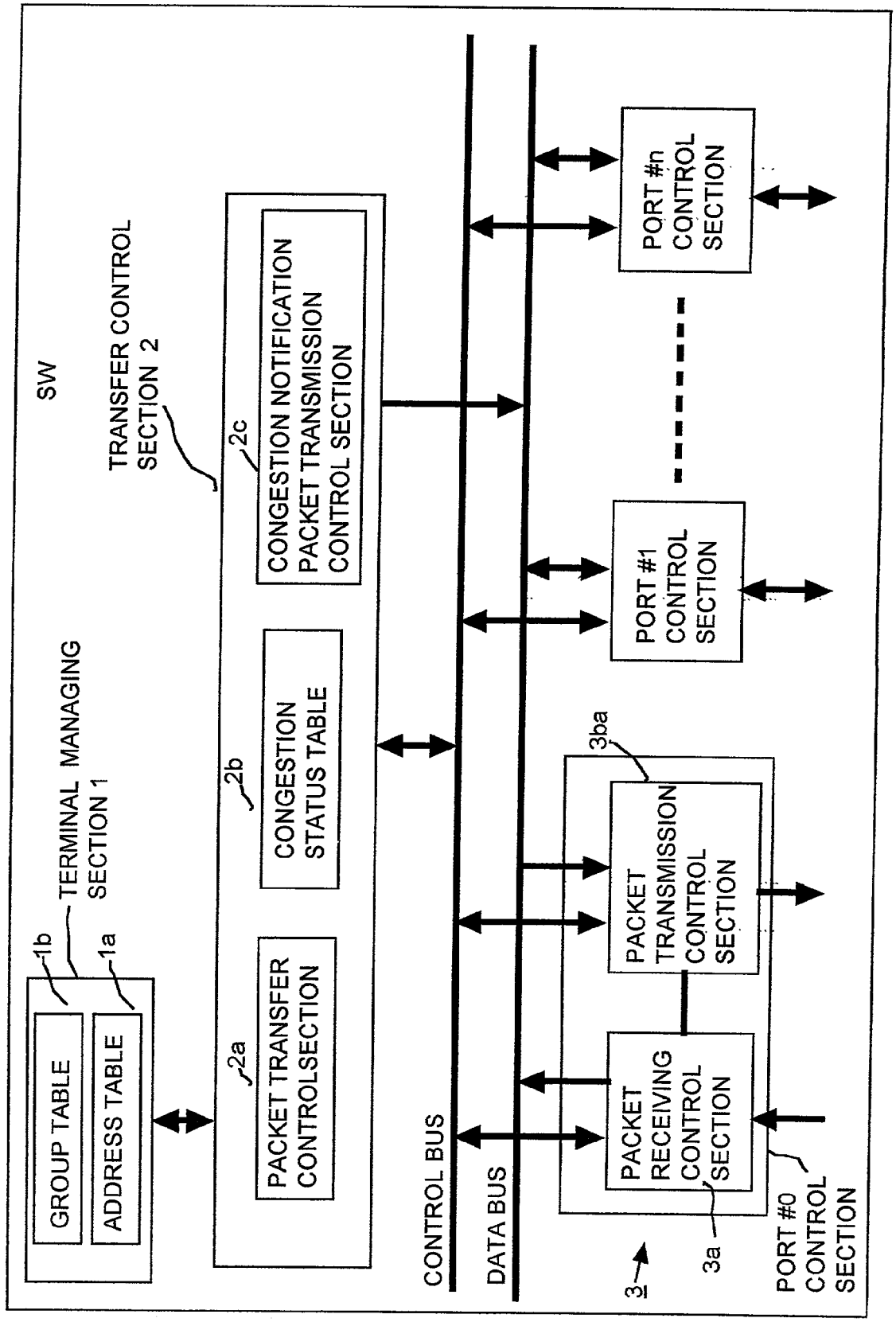
FIG. 26A is a general block diagram showing details of a switching hub of a third embodiment of a flow control apparatus.
Figure 26B:
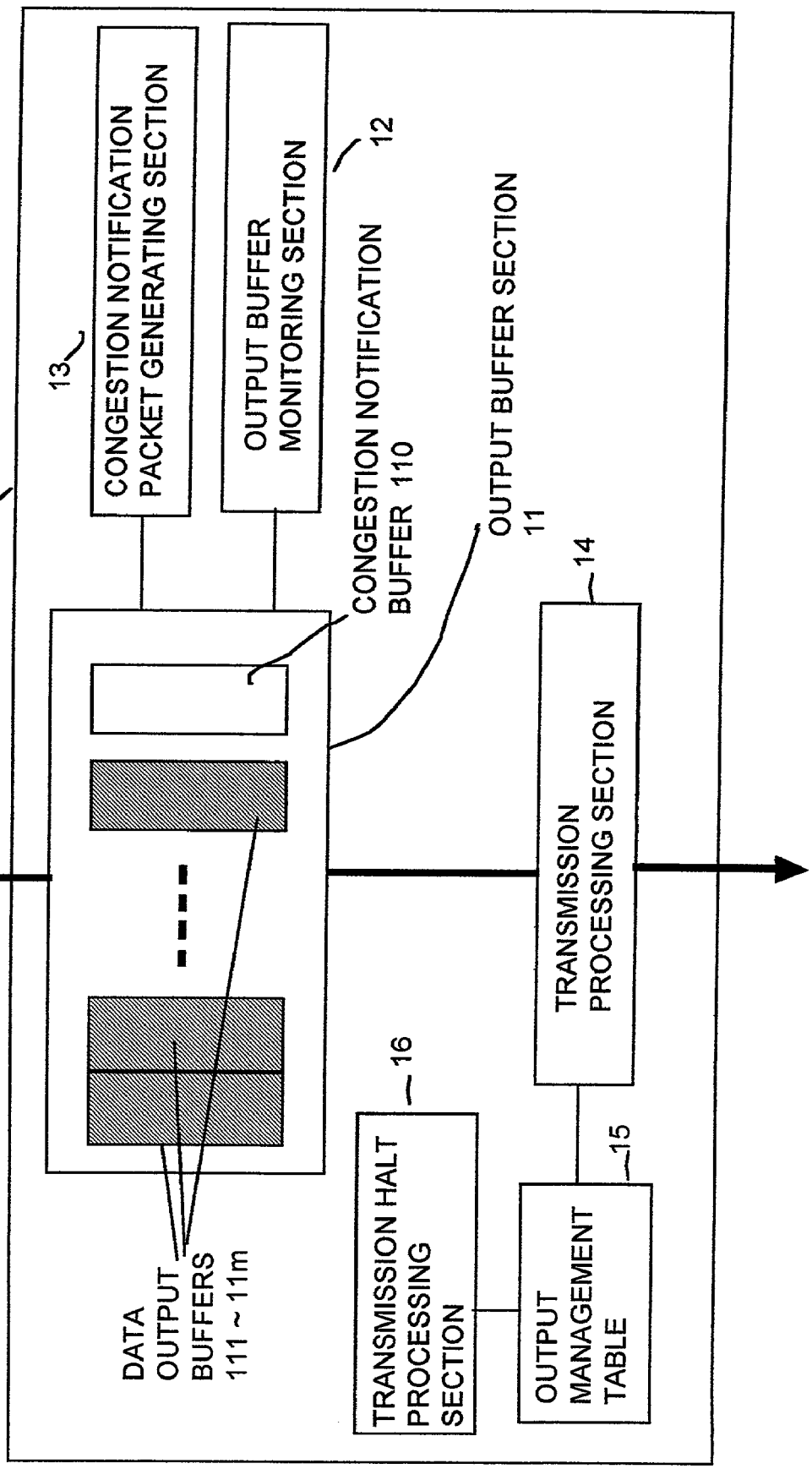
FIG. 26B is a block diagram of a packet transmission control section of a port of a switching hub of the third embodiment.

With the third embodiment, as shown in FIGS. 26A and 26B, the configuration differs from the first embodiment in that a path for transferring commands exists between the packet receiving control section 300a of a port and the packet transmission control section 300b of that port, and in that a transmission halt processing section 16 and an output management table 15 are added to the packet transmission control section 300b of a port. When a congestion notification packet is received at a port, then instead of transferring that congestion notification packet to another port, a halt is applied to readout of data packets from the data output buffer (of that receiving port) which corresponds to the group that is identified in the congestion notification packet. In the same way as for the first embodiment, the respective data output buffers assigned to the groups #1 to #m are designated as 11l to 11m respectively.

The overall operation will be described referring to FIG. 27A, in which it is assumed that data packets being sent to the group #1 terminal A from terminals D and G of group #1 are transmitted out of port P21 of the backbone switching hub SW2, and that the rate at which these data packets are received from the terminals D and G exceeds the output speed capability of port P21. With this example, it is assumed that a first-stage congestion status has been reached, due to a predetermined first threshold value of utilization level having been exceeded, for the data output buffer corresponding to group #1 in port P21, and that this occurs as a result of a data packet transferred to port P21 which originated from the group #1 terminal G. In that case, an individual congestion notification packet is transmitted from port P23, addressed to the terminal G.

When this congestion notification packet is received at the port P50 of the hub SW5 (i.e., port from which the congestion-origin data packet was transmitted from that hub to the backbone switching hub SW2) then readout is halted from the data output buffer 11l corresponding to group #1 (the group which is specified in the congestion notification packet) at port P50. Hence, transfer of data packets from terminal G to port P21 is immediately halted.

As a result of the halt in readout of data packets from the terminal group #1 data output buffer of port P50 of switching hub SW5, as data packets continue to be transferred to that buffer from the terminal G, the threshold value of utilization level for that buffer may eventually be exceeded. When that occurs, a pause packet is generated at port P51 of the hub SW5, and transmitted to the terminal G.

It can be understood that such a method has the advantage that it becomes possible to immediately halt transfer of data packets, originating from the terminal G, into the data output buffer that has reached a first-stage congestion status.

At that time, assuming for example that the threshold value of utilization level has not been reached for the data output buffer in port P50 of hub SW5 that is assigned to group #2, then data packets can be sent from terminal E of group #2 to terminal B irrespective of the occurrence of congestion with respect to group #1. Similarly, data packets could be transmitted from terminal I of group #4 via the hub SW5 to terminal F.

Next, referring to FIG. 27B, the case will be described in which a total of n ports, designated P21 to P2n (where n may be a large number, but only ports P21, P22, P23 are shown in the drawing) are provided in hub SW2, and in which there are a total of (N−2) second-layer hubs SW3 to SWN, with only SW3 to SW5 being shown. It is assumed that a second-stage congestion status has been exceeded for the data output buffer of port P21 that is assigned to terminal group #1, i.e., that a predetermined second-stage threshold value of utilization level, higher than the first-stage value, has been exceeded for that buffer. In this case, group-specific congestion notification packets are transmitted from ports of hub SW2 (other than the port which is in the congestion status) to each of the ports of the front-end hubs (in FIG. 27B, to ports P22, P23) which are connected to group #1 terminals. When the hubs SW4, SW5 each receive a group-specific congestion notification packet, then in each of these switching hubs, readout is halted from the data output buffer 11l (the buffer corresponding to the terminal group specified in the congestion notification packet) of the receiving port, e.g., port P50 of hub SW5.

In that condition, data packets from group #1 terminals can only be sent to the hub SW2 from the hub SW3, so that all transfer of data packets into the data output buffer 11l of port P21 of hub SW2 is immediately halted. As a result, rapid recovery from the data congestion condition of the data output buffer 11l of that port can be achieved.

Figure 27A:
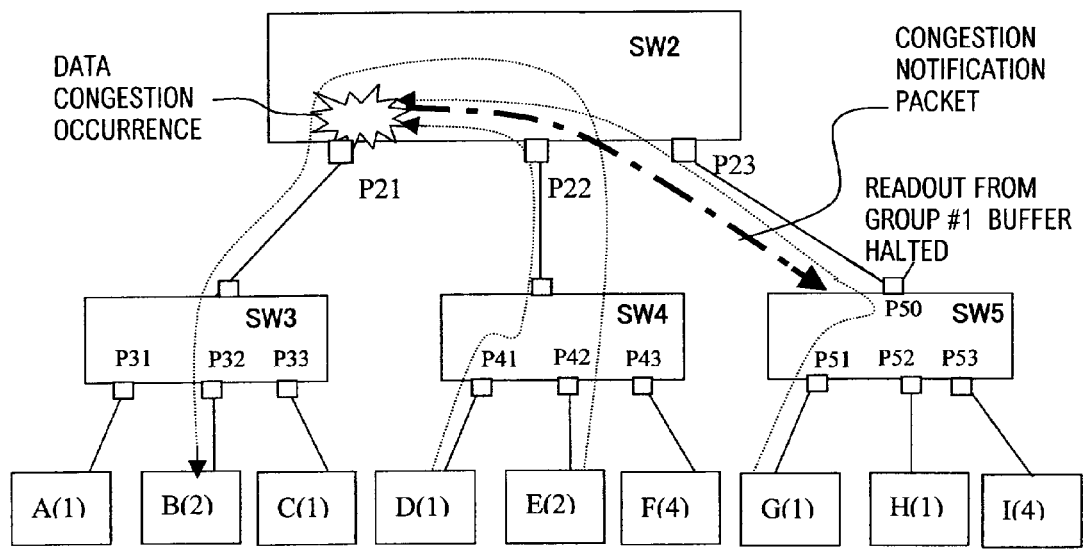
FIG. 27A is a conceptual system diagram for describing the operation of the third embodiment, for the case of an individual congestion notification packet being generated.
Figure 27B:
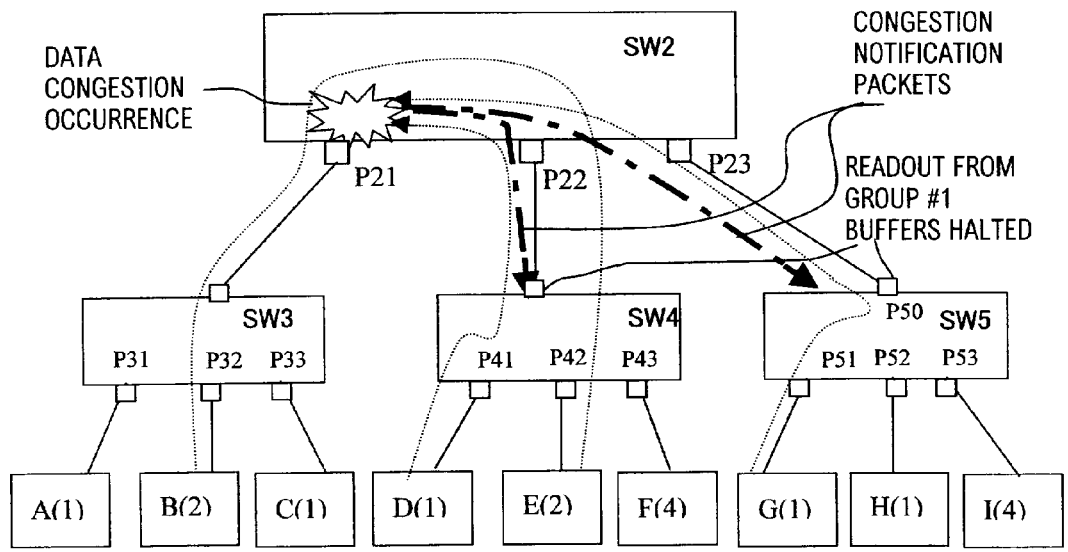
FIG. 27B is a conceptual system diagram for describing the operation of the third embodiment, for the case of a plurality of group-specific congestion notification packets being generated.

At this time, in the same way for the example of FIG. 27A, at each port of a switching hub affected by a congestion notification packet, only those data output buffers which are assigned to group #1 are subjected to halting of readout, so that communication can continue to be performed within other terminal groups.

The operation and configuration of this embodiment will be described in more detail the following. With the third embodiment as shown in FIG. 26B, the packet transmission control section 300b of each port further includes a transmission halt processing section 16 which can act on the transmission processing section 14 to change each of the data output buffers 11l to 11m assigned to the respective terminal groups between a condition in which readout from that buffer is possible and a condition in which readout is inhibited during a specific time interval. The packet transmission control section 300b further includes an output management table 15 which registers the buffer readout statuses of the respective terminal groups.

FIG. 28 shows an example of the configuration of the output management table 15. As shown, a 1-bit value designated as Read Status and a 2-bit value designated as Pause Status are respectively managed for each of the terminal groups #0 to #m which can use that port by multiplexed operation. For each of these groups, the corresponding Read Status value indicates whether or not readout is currently enabled from the data output buffer that is assigned to that group. The corresponding Pause Status value indicates whether a timer (referred to in the following as the halt timer) that is assigned to that group is in the non-operating state (Pause Status: 0), is in operation as a result of an individual congestion notification packet being generated (Pause Status: 1), or is in operation as a result of a group-specific congestion notification packet being generated (Pause Status: 2).

The packet receiving operation will be described referring to FIG. 29, in which processing steps corresponding to those of FIG. 9 for the first embodiment are indicated by identical designations to those of FIG. 9. When a packet is received by a port, the packet header is decoded by the packet receiving control section 3a (step S1) and if it is found to be a data packet or a pause packet then the same processing is executed as described for the first embodiment (data packet: steps S3 to S5, pause packet: steps S9, S10). If the received packet is found to be a congestion notification packet, then the packet transmission control section 300b of that port is notified of the pause time value and the group identifier from that packet, and the type of congestion notification packet (step S7a) and then the received packet is discarded (step S10).

Figure 29:
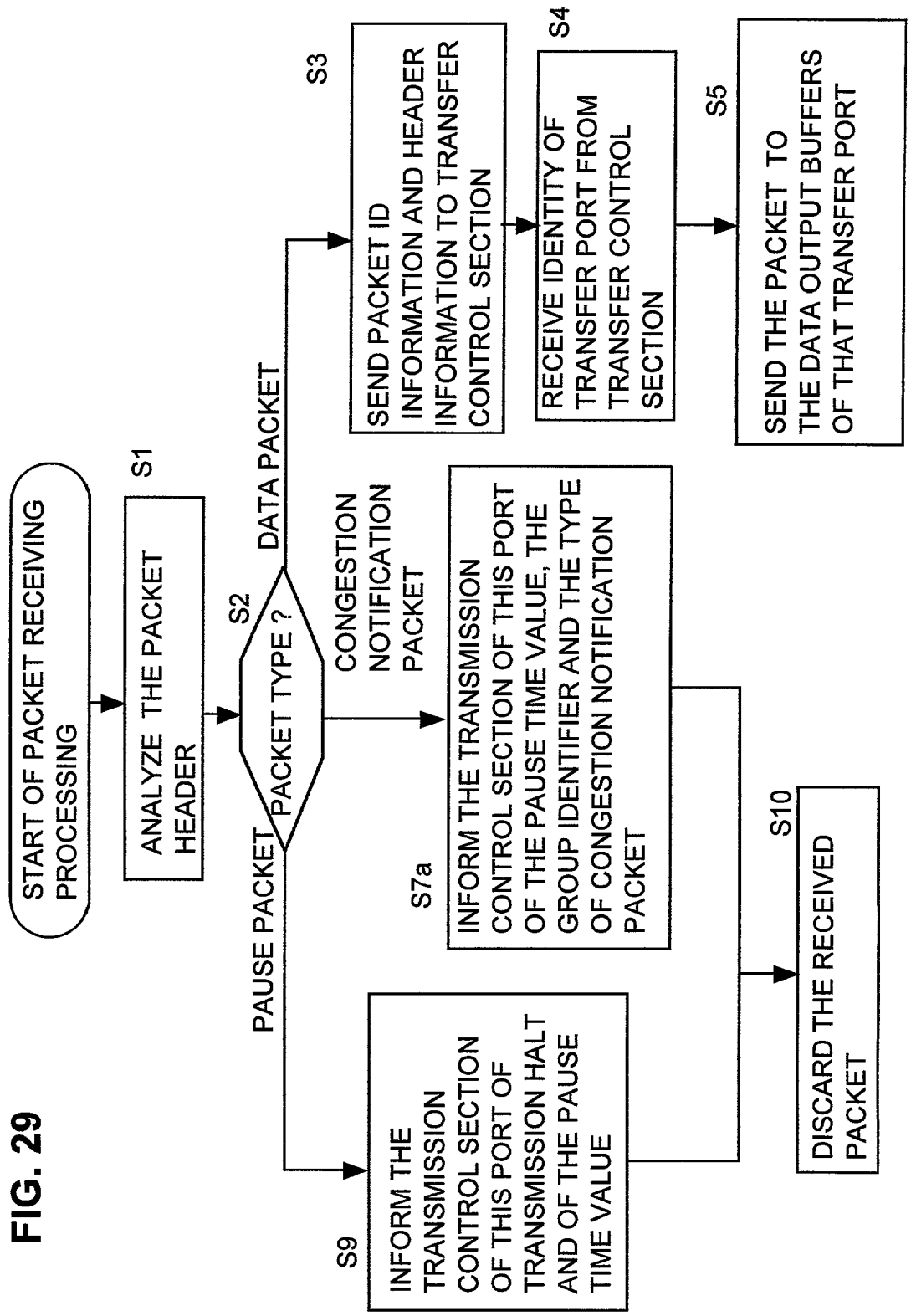
FIG. 29 is a flow diagram of the operation of a packet receiving control section of a port of a switching hub of the third embodiment.

As shown in the flow diagram of FIG. 29, when processing of a received congestion notification packet by the packet receiving control section 3a of a port has been completed, no further packets are transmitted from the data output buffer which corresponds to the terminal group specified in the congestion notification packet. As a result, the packet transfer control section 2a is not required to perform the congestion notification packet generating information transfer processing (step S7 of FIG. 9) of the first embodiment.

Figure 30:
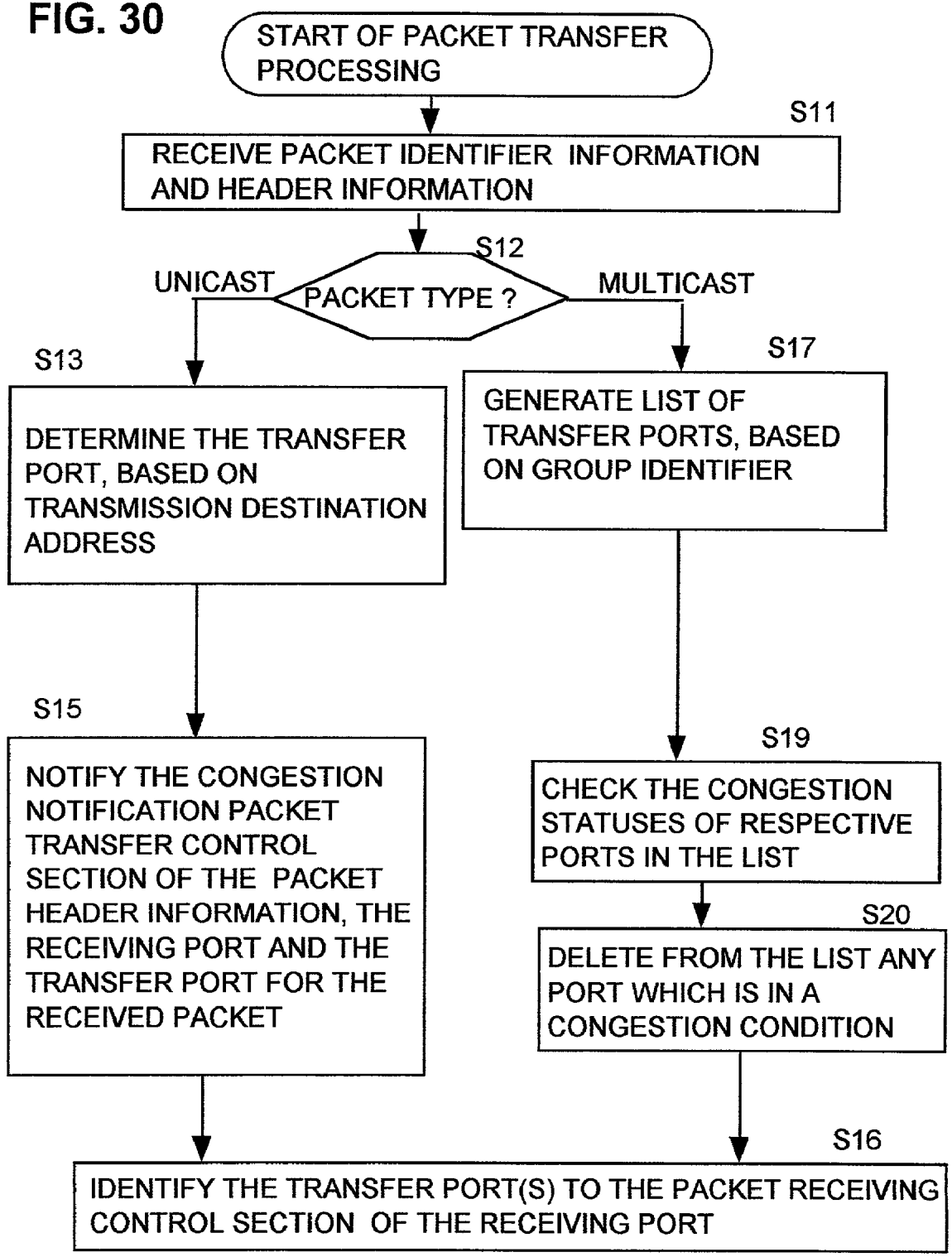
FIG. 30 is a flow diagram of the operation of a transfer control section of a port of a switching hub of the third embodiment.

The packet transmission processing executed with this embodiment is shown in the flow diagram of FIG. 30. As shown, this differs from that of the first embodiment (shown in FIG. 10) in that the data packet judgement steps S14 and S18 of FIG. 10 are omitted.

Figure 31:
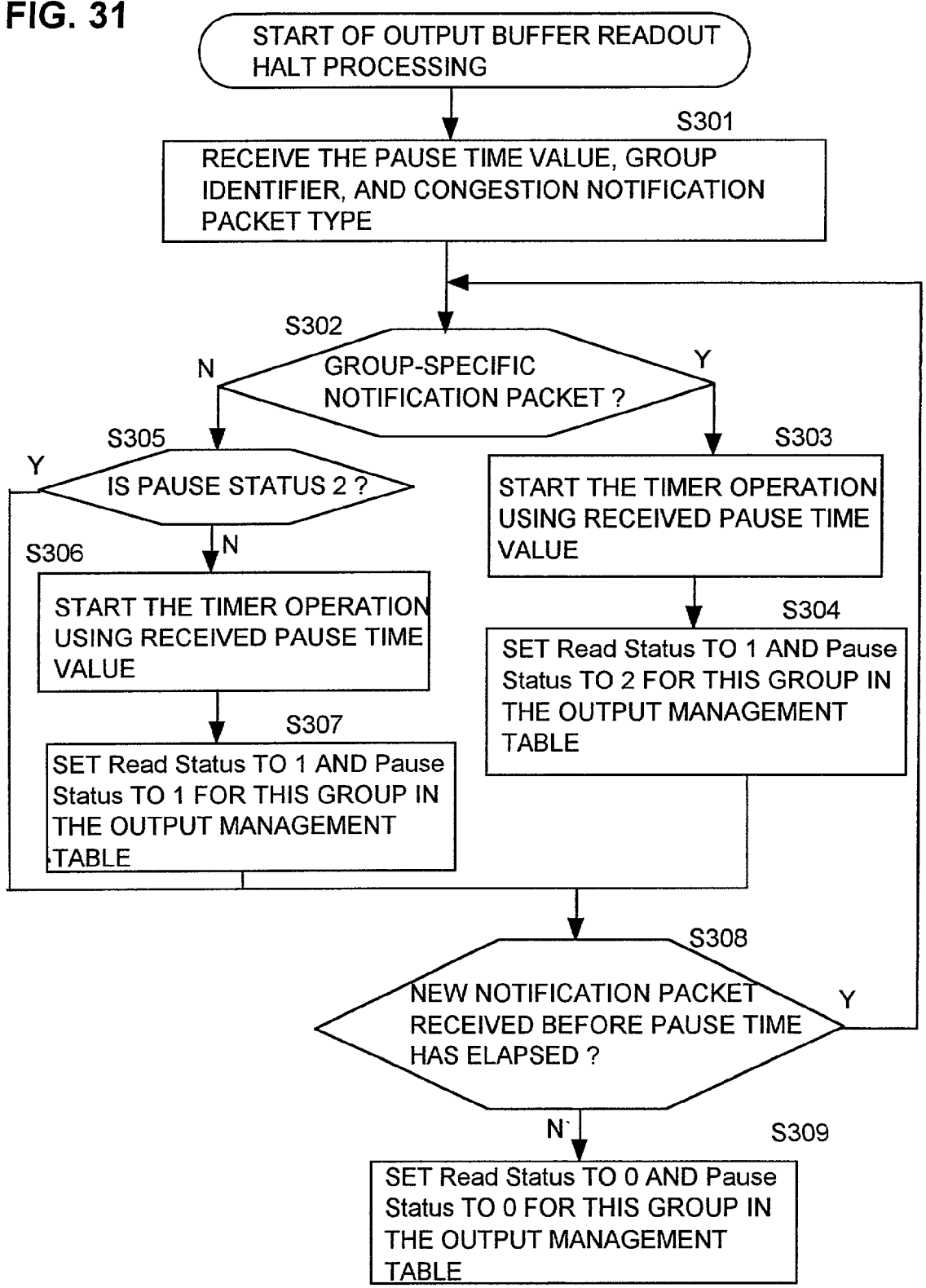
FIG. 31 is a flow diagram of buffer readout halt processing which is applied in a port of a switching hub of the third embodiment.
Figure 33A:
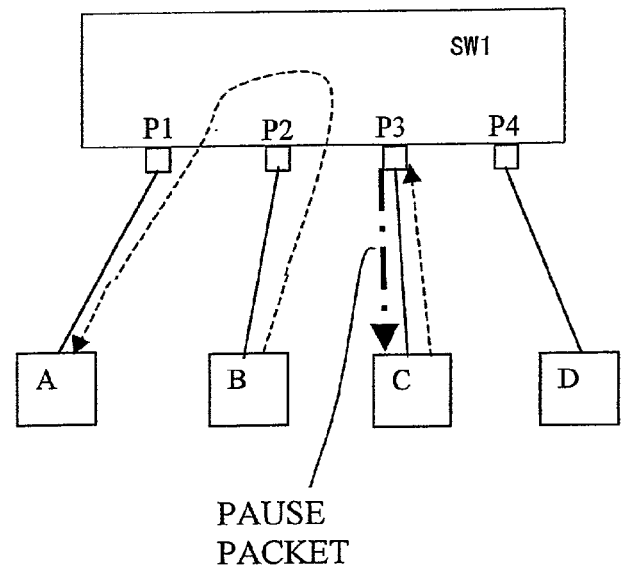
FIG. 33A and FIG. 33B are conceptual system diagrams for describing the operation of respective examples of prior art types of flow control apparatus.
Figure 33B:
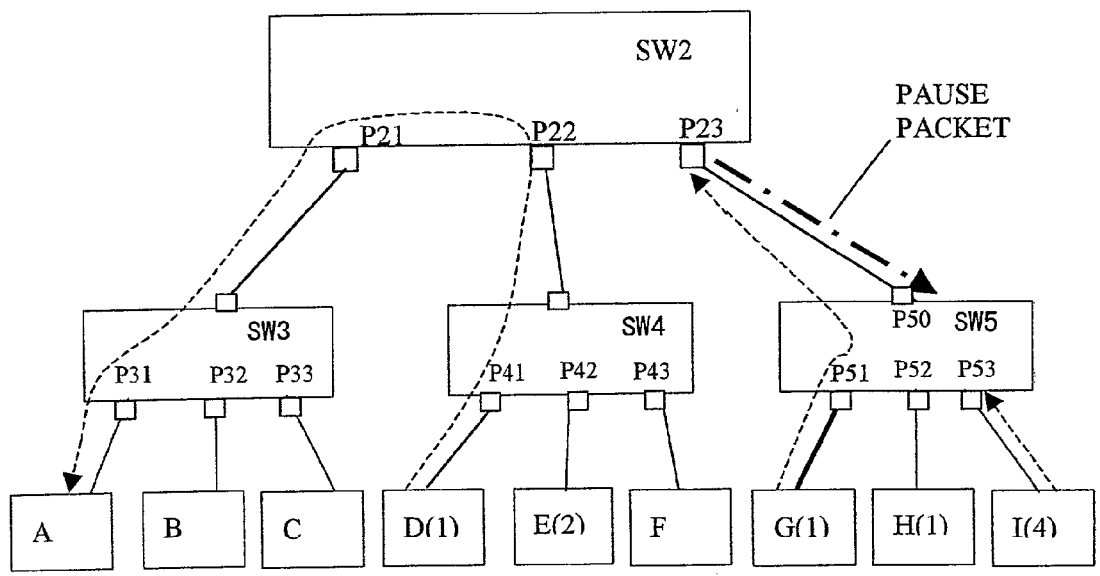
Figure 34A:
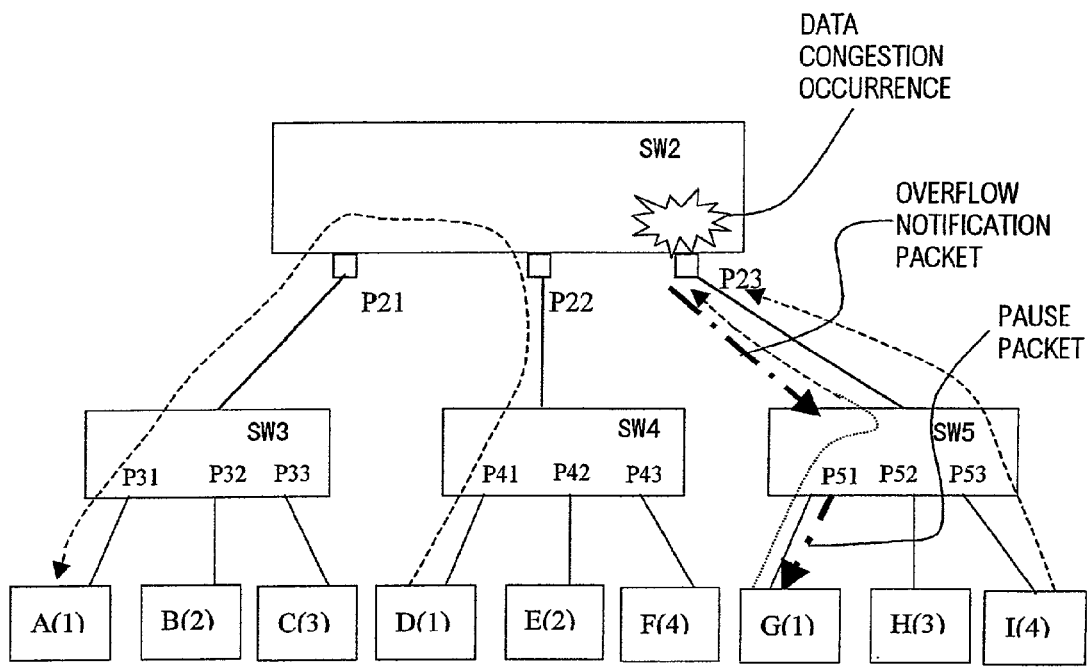
FIGS. 34A and 34B are conceptual system diagrams for describing the operation of another example of a prior art type of flow control apparatus.
Figure 34B:
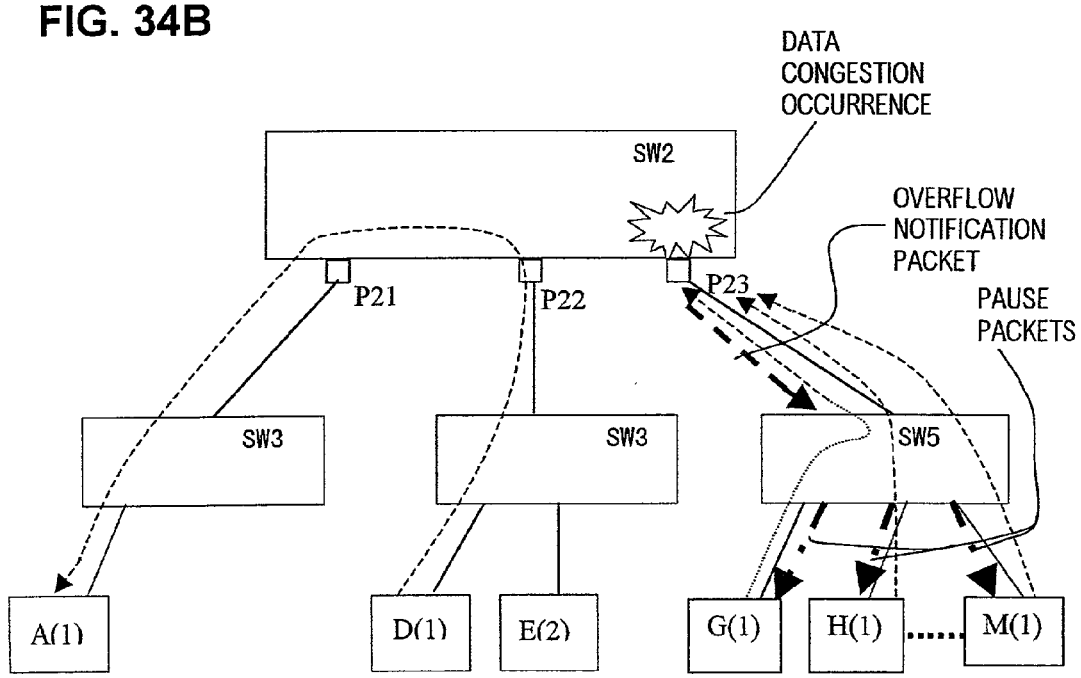

The operation of the transmission halt processing section 16 within the packet transmission control section 300b of a port of this embodiment will be described referring to FIG. 31. When the transmission halt processing section 16 is notified that a congestion notification packet has been received, then if the packet is of group-specific type (i.e., a Y decision in step S302) then irrespective of the Read Status and Pause Status values which have been registered for the corresponding terminal group at that port, operation of the aforementioned halt timer is started, to continue until the pause time value specified in the received congestion notification packet has elapsed (step S303) and the value Read Status for the specified group is set to 1 and Pause Status to 2 (step S304). If the received congestion notification packet is an individual congestion notification packet (i.e., a N decision in step S302) the halt timer operation is started, to continue until the pause time value specified in the received congestion notification packet has elapsed, and the Read Status and Pause Status for the group concerned are each set to 1 (step S307). On the other hand, if Read Status for the specified group is 2, at the time when the congestion notification packet is received (i.e., a Y decision in step S305) then no further processing is performed.

Once the halt timer operation has been started, if no further congestion notification packet specifying the group concerned is received before the timer interval has elapsed (i.e., a N decision in step S308) then both the Read Status and Pause Status values for that group are set to 0 (step S309).

The pause time value specified in a group-specific congestion notification packet (i.e., resulting from occurrence of second-stage congestion at a port) is made greater than the pause time value specified in an individual congestion notification packet. Thus, when a group-specific congestion notification packet is received by the packet transmission control section 300b of a port, it is ensured that there is no possibility of overwriting of the Read Status and Pause Status values established as a result of that group-specific congestion notification packet, if an individual congestion notification packet specifying a terminal of the same group as that identified in the group-specific congestion notification packet should be subsequently received at that port before the halt timer interval has elapsed.

It can thereby be ensured that the pause duration which is established in response to a received group-specific congestion notification packet cannot be accidentally shortened, as a result of an individual congestion notification packet being received, so that packet loss can be reliably prevented.

Figure 14:
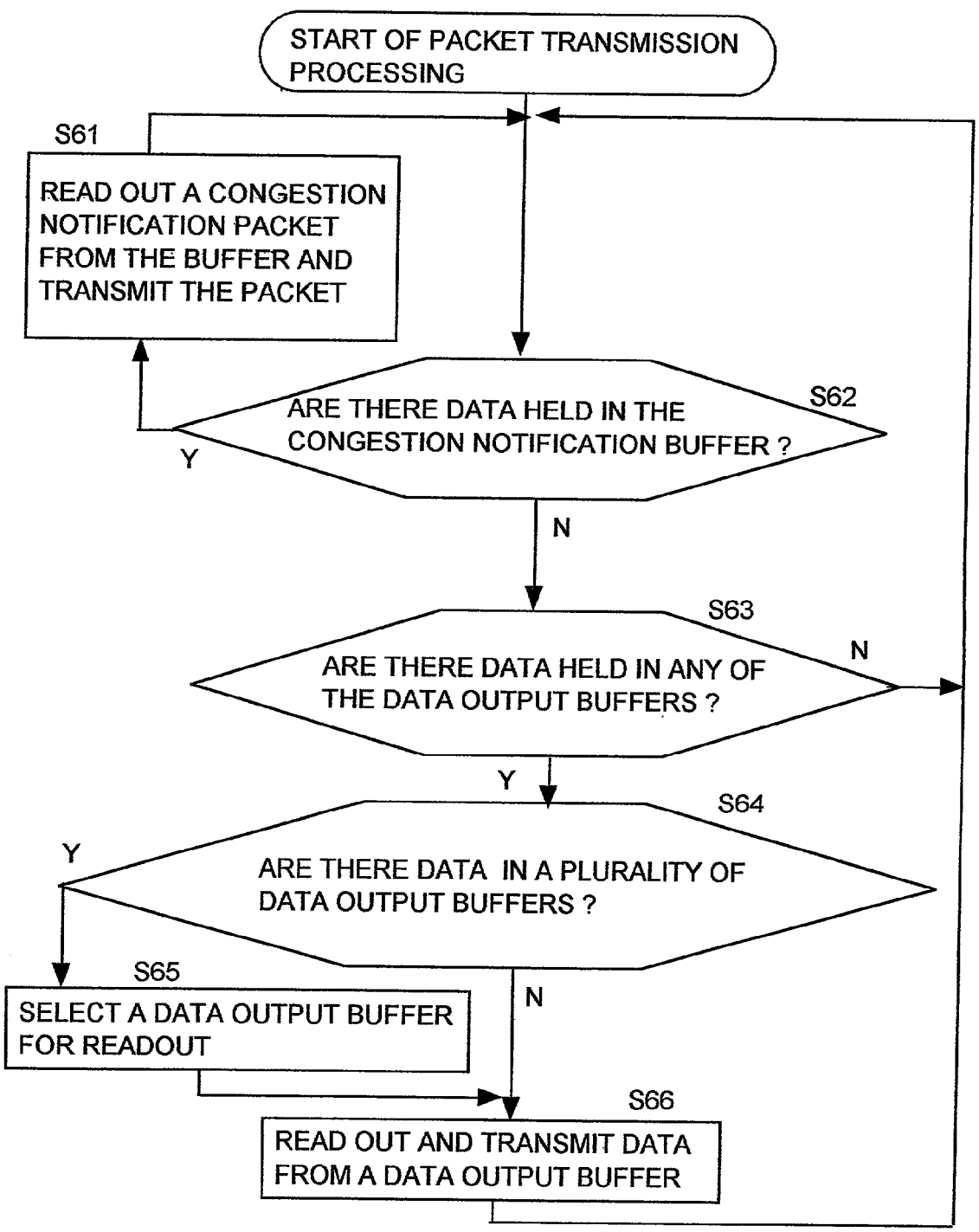
FIG. 14 is a flow diagram of the operation of the packet transmission control section of a port of a switching hub of the first embodiment, shown in FIG. 3.

Since with this embodiment the data output buffer readout status at a port is controlled based on the contents of the output management table 15 of that port, the flow diagram of packet transmission processing contains one more step than that of the first embodiment shown in FIG. 14, i.e., a step S65a is added as shown in the flow diagram of FIG. 32.

With this embodiment, when a congestion notification packet is received by a port, it is given priority for processing, in the same way as for the first embodiment (step S61~S62). If there are data held in any of the data output buffers (a Y decision in step S63) then a decision is made as to whether or not a plurality of the data output buffers of that port currently contain data, and if that condition is found (i.e., Y in step S64), one of these data output buffers is selected for readout (step S65). Following step S65, or if there is a N decision in step S64, step S65a is executed, to find whether the terminal group corresponding to the buffer which is to be read out has a Read Status value of 0.

As shown in FIG. 32, if it is found that Read Status is 1 (a N decision in step S65a), and there are data in a plurality of the data output buffers of that port, then step S65 will thereafter again be executed, to select another of the data output buffers.

As can be understood from the above description, with the third embodiment it is possible to apply flow control separately to respective terminal groups, without performing any transfer of information relating to congestion notification packets within a switching hub. Furthermore, processing is executed using congestion notification packets having the same frame formats as for the first and second embodiments.

With all of the embodiments described above, flow control can be applied without causing problems between respective terminal groups. This is true for any combination of switching hubs which have ports configured in accordance with any of the above embodiments.

It can thus be understood that with the present invention as described above, judgement of the occurrence of congestion in the output section (i.e., packet transmission control section) of a group-multiplexing port of a switching hub is performed respectively separate separately for each of the groups of terminals. When a congestion status is detected, congestion notification packets are generated and sent only to one or more terminals of the group for which the congestion is judged to have occurred. Hence, congestion control operations do not have a significant effect upon other terminal groups, i.e., limitation of transmission is only applied to those terminal for which it is actually necessary.

It can moreover be understood that with the present invention, depending upon the degree of congestion, the type of congestion notification packet that is generated can be changed to either a congestion notification packet which is directed to an individual terminal or a congestion notification packet which is directed to a specific group of terminals.

Although the above embodiments have been described referring to a simple example of a switching hub network hierarchy having only a backbone hub and a layer of front-end hubs, it will be apparent that the invention is applicable to a network hierarchy configuration having a greater degree of complexity and larger number of layers.

Furthermore although the invention has been described in the above with reference to specific embodiments, it should be understood that various modifications of these embodiments could be envisaged, which fall within the scope claimed for the invention in the appended claims.

What is claimed is:

1. A flow control apparatus having a network of switching hubs each having a plurality of ports, each port formed of an input section which receives data packets from a data communication link and an output section which transmits data packets to said data communication link, with said switching hubs interconnected in a hierarchy for controlling transfer of data packets between respective terminals within each of a plurality of terminal groups, each said data packet including a group identifier, and each of said switching hubs having at least one group-multiplexing port which is configured to operate on data packets of said plurality of terminal groups based upon use of said group identifiers; wherein each switching hub comprises congestion judgement means for detecting occurrence of a congestion status at an output section of one of said ports, with said judgement being performed respectively separately for each of said terminal groups, and for determining specific one of said terminal groups as having caused said congestion status, and congestion notification packet outputting means for outputting a congestion notification packet which contains pause time information and is directed to said specific terminal group for controlling one or more terminals within the specific terminal group at once.

2. The flow control apparatus according to claim 1, wherein said congestion status is judged as being one of a first degree and a second degree of congestion, and wherein said congestion notification packet outputting means of said switching hub generates a congestion notification packet which is transmitted from a single port of said switching hub, when said first degree of congestion is detected, and generates congestion notification packets which are respectively transmitted from each of said ports of said switching hub that are connected to said specific terminal group, other than said port which is in said congestion status, when said second degree of congestion is detected.

3. The flow control apparatus according to claim 2, wherein when a data packet is received at a first port of said switching hub and said first degree of congestion occurs when said data packet is internally transferred to a second port of said switching hub to be transmitted therefrom, said congestion judgement means assigns a source terminal of said received data packet as being the origin of said congestion, and said congestion notification packet outputting means generates and transmits from said first port a congestion notification packet which is directed to said congestion origin terminal.

4. The flow control apparatus according to claim 3, wherein said congestion notification packet which is transmitted upon occurrence of said first degree of congestion is an individual congestion notification packet containing destination address information identifying said congestion origin terminal.

5. The flow control apparatus according to claim 2, wherein when a data packet is received at a first port of said switching hub and said second degree of congestion occurs when said data packet is internally transferred to a second port of said switching hub to be transmitted therefrom, said congestion judgement means assigns a terminal group corresponding to the source terminal of said received data packet as being the origin of said second degree of congestion, and said congestion notification packet outputting means generates and transmits from each of said ports of the switching hub, other than said congestion status port, respective congestion notification packets directed to said congestion origin terminal group.

6. The flow control apparatus according to claim 5, wherein each said congestion notification packet which is transmitted upon occurrence of said second degree of congestion is a group-specific congestion notification packet containing group identifier information identifying said congestion origin terminal group.

7. The flow control apparatus according to claim 6, wherein said group-specific congestion notification packet contains a broadcast address as a destination address of said packet.

8. The flow control apparatus according to claim 6, wherein said pause time information that is inserted in an internally generated individual congestion notification packet is a calculated pause time value which is derived by modifying a fixedly predetermined reference pause time value in accordance with a relationship between a data transfer rate of a data communication link of said port from which said congestion notification packet is to be transmitted and a fixedly predetermined reference data transfer rate.

9. The flow control apparatus according to claim 8, wherein said calculated pause time value is derived by multiplying said reference pause time value by the ratio of said data transfer rate of said data communication link to said reference data transfer rate.

10. The flow control apparatus according to claim 6, wherein said pause time information that is inserted in an internally generated group-specific congestion notification packet is a pause time value which is derived by modifying a fixedly predetermined reference pause time value in accordance with a relationship between a data transfer rate of a data communication link of said port from which said packet is transmitted and a fixedly predetermined reference data transfer rate, to obtain a calculated pause time value, and adding to said calculated pause time value a randomly determined positive value.

11. The flow control apparatus according to claim 10, wherein said calculated pause time value is derived by multiplying said reference pause time value by the ratio of said data transfer rate of said data communication link to said reference data transfer rate.

12. The flow control apparatus according to claim 11, wherein each said switching hub comprises means functioning when a congestion notification packet is received at a first port thereof, to determine a second port thereof as a transfer port for said congestion notification packet, use information contained in said received congestion notification to generate a corresponding congestion notification packet containing a new pause time value, to be transmitted from said transfer port, when said transfer port is a group-multiplexing port which receives data packets from a plurality of terminal groups, and use information contained in said congestion notification packet to generate a pause packet, containing a new pause time value, to be transmitted from said transfer port, when said transfer port is other than a group-multiplexing port.

13. The flow control apparatus according to claim 12, wherein when said corresponding congestion notification packet is an individual congestion notification packet or when a pause packet is generated, said new pause time value is derived by modifying said pause time value contained in said received congestion notification packet in accordance with a relationship between a data transfer rate of a data communication link of said first port and a data transfer rate of a data communication link of said transfer port 14. The flow control apparatus according to claim 13, wherein said new pause time value is derived by multiplying said pause time value contained in said received congestion notification packet by the ratio of said data transfer rate of the data communication link of said transfer port to said data transfer rate of the data communication link of said first port.

15. The flow control apparatus according to claim 12, wherein when said corresponding congestion notification packet is a group-specific congestion notification packet, said new pause time value is derived by modifying said pause time value contained in said received congestion notification packet in accordance with a relationship between a data transfer rate of a data communication link of said first port and a data transfer rate of a data communication link of said transfer port, and randomizing a resultant value.

16. The flow control apparatus according to claim 15, wherein said new pause time value is derived by
   multiplying said pause time value contained in said received congestion notification packet by the ratio of said data transfer rate of the data communication link of said transfer port to said data transfer rate of the data communication link of said first port, and
   adding a randomly determined positive value to a result obtained thereby.

17. The flow control apparatus according to claim 2, wherein said first and second degrees of congestion are detected for a data output buffer based on first and second predetermined threshold values of utilization level, respectively, being exceeded for said data output buffer.

18. The flow control apparatus according to claim 1, wherein said output section of a group-multiplexing port of a switching hub comprises a single data output buffer used in common for data packets of all of said terminal groups, said switching hub comprises means for calculating respective rates of data flow from said terminal groups into said data output buffer, and wherein said congestion status is judged respectively separately for each of said terminal groups based on said rates of data flow.

19. The flow control apparatus according to claim 2, wherein said output section of each port of a switching hub comprises a single data output buffer used in common for data packets of all of said terminal groups, said switching hub comprises means for calculating respective rates of data flow from said terminal groups into said data output buffer, and wherein said first-degree congestion status is judged as having been reached when a rate of data flow from any one of said groups exceeds a specified threshold value, and said second-degree congestion status is judged as having been reached when a value of utilization factor of said data output buffer exceeds a predetermined threshold value.

20. The flow control apparatus according to claim 19, wherein said specified threshold value is obtained by dividing a predetermined maximum rate of data flow into said data output buffer by a total number of terminal groups which are currently utilizing said data output buffer.

21. The flow control apparatus according to claim 20, wherein said switching hub comprises means functioning when said second-degree congestion status is judged to be reached, for executing processing to transmit congestion notification packets to all of said terminal groups which have a possibility of transmitting data packets that would be transferred within said switching hub to said data output buffer that has reached said second-degree congestion status.

22. The flow control apparatus according to claim 4, wherein said switching hub comprises timer means for measuring a time interval beginning from the point of transmitting said group-specific congestion notification packet and means functioning, when said port is judged to be in a congestion status after said time interval has elapsed, to retransmit said group-specific congestion notification packet.

23. The flow control apparatus according to claim 22, wherein said switching hub comprises means for determining a pause time which is specified in said group-specific congestion notification packet, by adding a non-zero value to a reference time value, and wherein said time interval of said timer means is determined based on said reference time value.

24. The flow control apparatus according to claim 23, wherein said non-zero value is a random number.

25. The flow control apparatus according to claim 1, wherein each of said switching hubs comprises means responsive to reception of a congestion notification packet at a port of said switching hub for halting transmission of data packets corresponding to a terminal group identified in said received congestion notification packet during a time interval which is determined based on said pause time information contained in said received congestion notification packet.

26. A flow control method for a network system which performs data packet communication within each of a plurality of respectively separate groups of terminals with said groups having respective group identifiers preassigned thereto, said network system formed of a plurality of switching hubs interconnected by data communication links, each switching hub having a plurality of ports with each port having an input section and an output section and with a part of said ports being group-multiplexing ports each operating on data packets of a plurality of said groups based on use of said group identifiers, the method comprising
   for each of said ports, in each of said switching hubs, executing judgement to detect when a congestion status of an output section of said each switching hub has been reached,
   when said congestion condition is detected, determining one of said terminal groups as being a congestion origin terminal group, for which congestion is occurring, and
   transmitting congestion notification information in accordance with said determination for controlling one or more terminals within the specified terminal group at once.

27. The method according to claim 26, wherein said judgement is executed to detect one of a plurality of degrees of congestion.

28. The method according to claim 27, wherein
   when a first degree of congestion is judged to be occurring at said port of a switching hub, a specific data packet is determined as being the immediate cause of said congestion status occurring, and said congestion notification information is transmitted from said port which was the receiving port for said specific data packet, and
   when a second degree of congestion is judged to be occurring at said port of a switching hub, a specific data packet is determined as being the immediate cause of said congestion status occurring, and congestion notification information is transmitted from all of respective ports of said switching hub that are connected to terminals of the group to which said specific data packet belongs.

29. The method according to claim 27, wherein when it is detected that a second one of said plurality of degrees of congestion has been reached at an output section of a port of a switching hub, one of said terminal groups is determined as causing said congestion, and group-specific congestion notification information is transmitted only to said terminal group.

30. The method according to claim 26, wherein when congestion notification information is received at an input section of a port of a switching hub, transmitted from another one of said switching hubs, a halt is applied to transmission from said output section of said port of data packets of a terminal group which is specified in said congestion notification information as the destination thereof.

31. The method according to claim 26, wherein each said output section of each of said ports comprises a plurality of data output buffers each assigned to data packets of a predetermined corresponding one of said terminal groups, and wherein said step of congestion judgement is executed at a port separately for each of said terminal groups, based upon a utilization factor of the corresponding one of said data output buffers, wherein said judgement step, a first congestion condition is judge to have been reached at a port, for a specific terminal group, when said utilization factor of the corresponding data output buffer exceeds a first predetermined threshold value, and wherein a second congestion condition is judged to have been reached for said terminal group when said utilization factor of the corresponding data output buffer exceeds a second predetermined threshold value, which is higher than said first threshold value.

* * * * *